(12) United States Patent
Gilbert et al.

(10) Patent No.: US 11,614,848 B1
(45) Date of Patent: Mar. 28, 2023

(54) GRAPHICAL USER INTERFACE OVERLAYS FOR CONTEXTUAL HARDWARE COMPONENT INFORMATION

(71) Applicant: Dell Products L.P., Round Rock, TX (US)

(72) Inventors: Matthew Bryan Gilbert, Bend, OR (US); Eric Graham, Austin, TX (US); Peace Iyiewuare, Austin, TX (US); Peder Brooks Piggott, Pflugerville, TX (US); Mark Alan Herring, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/935,444

(22) Filed: Sep. 26, 2022

(51) Int. Cl.
*G06F 3/0481* (2022.01)
*G06T 11/00* (2006.01)
*G06F 3/04842* (2022.01)

(52) U.S. Cl.
CPC ........ *G06F 3/0481* (2013.01); *G06F 3/04842* (2013.01); *G06T 11/00* (2013.01); *G06T 2200/24* (2013.01)

(58) Field of Classification Search
CPC .... G06F 3/0481; G06F 3/04842; G06T 11/00; G06T 2200/24
See application file for complete search history.

(56) References Cited

U.S. PATENT DOCUMENTS

2019/0130618 A1* 5/2019 Todasco .............. G06F 3/04886

\* cited by examiner

*Primary Examiner* — Shen Shiau
(74) *Attorney, Agent, or Firm* — Norton Rose Fulbright US LLP

(57) ABSTRACT

A method for generating a graphical overlay indicating component characteristics for a graphical representation of an information handling system includes determining one or more component characteristics of one or more hardware components of a second information handling system, generating a first graphical overlay for a first graphical representation of a physical configuration of the one or more hardware components based on the one or more component characteristics, determining a selected view, and displaying the first graphical overlay and the first graphical representation based on the determination of the selected view.

20 Claims, 14 Drawing Sheets

| | Status | Name | State | Slot Number | Size | Security Status | Bus Protocol | Media Type | Hot Spare | Remaining Rated Write Endurance | Actions | Pending Actions |
|---|---|---|---|---|---|---|---|---|---|---|---|---|
| + | ☐ | SSD 0 | Non-RAID | 0 | 1117.79 GB | Not Capable | SATA | SSD | No | 100% | Actions | ⌄ |
| + | ☐ | Solid State Disk 0:1:0 | Online | 0 | 1117.25 GB | Not Capable | SATA | SSD | No | 100% | Actions | ⌄ |
| + | ☐ | Solid State Disk 0:1:1 | Ready | 1 | 1117.25 GB | Not Capable | SATA | SSD | No | 100% | Actions | ⌄ |
| + | ☐ | Physical Disk 0:1:2 | Online | 2 | 1117.25 GB | Not Capable | SAS | HDD | No | Not Applicable | Actions | ⌄ |
| + | ☐ | Physical Disk 0:1:3 | Online | 3 | 1117.25 GB | Not Capable | SAS | HDD | No | Not Applicable | Actions | ⌄ |
| + | ☐ | Physical Disk 0:1:7 | Online | 7 | 931 GB | Not Capable | SAS | HDD | No | Not Applicable | Actions | ⌄ |

FIG. 2

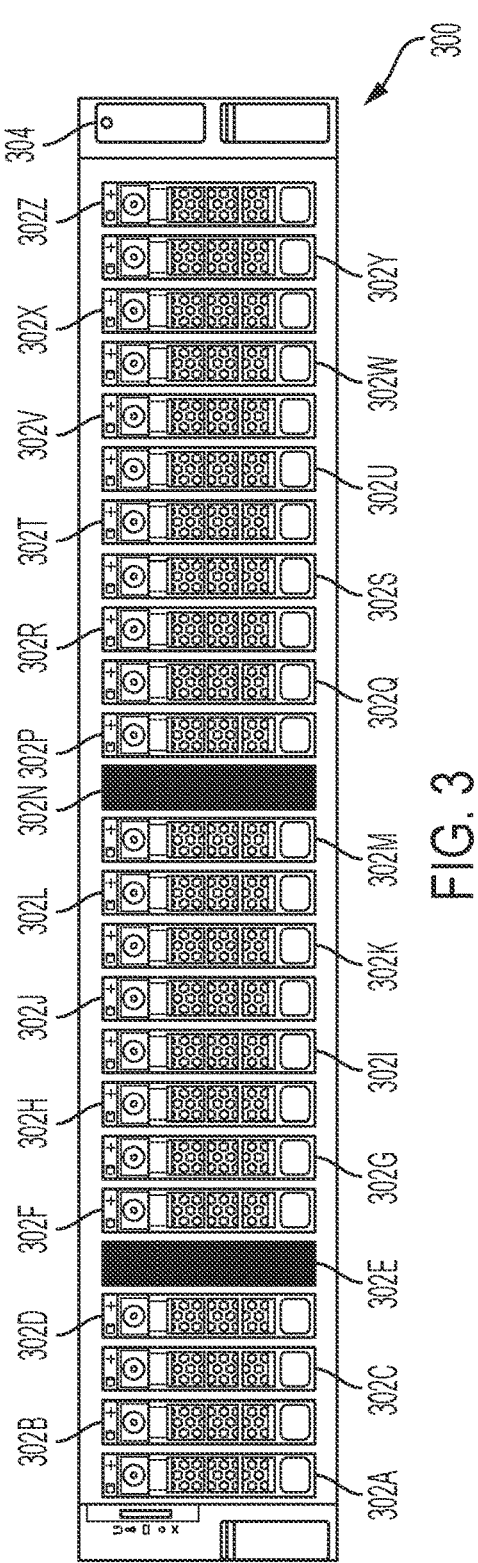

FIG. 3

GRAPHICAL USER INTERFACE OVERLAYS FOR CONTEXTUAL HARDWARE COMPONENT INFORMATION

FIELD OF THE DISCLOSURE

The present disclosure generally relates to graphical user interfaces for information handling systems, and more particularly relates to graphical user interface overlays for contextual hardware information in information handling systems.

BACKGROUND

As the value and use of information increase, individuals and businesses seek additional ways to process and store information. One option is an information handling system. An information handling system generally processes, compiles, stores, and/or communicates information or data for business, personal, or other purposes. Because technology and information handling needs may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

Information handling systems may include numerous hardware components having a variety of different forms and functions. Some information handling systems may include multiple slots, which may be hardware components themselves, for housing hardware components, such as hard disks, solid state drives, batteries, connectivity cards, dynamic RAM, and other components. A single information handling system may include up to hundreds, or more, hardware components. Hardware components of such information handling systems may be similar in appearance but may have different functions or capabilities. It may be difficult to determine details regarding a particular information handling system component simply by viewing the physical information handling system given the number and potentially similar appearance of hardware components contained in the information handling system. Furthermore, details regarding configuration of information handling system hardware components may not be readily apparent when viewing a physical exterior of an information handling system.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

A first information handling system may generate a graphical representation of a physical configuration of one or more hardware components of a second information handling system based on a physical configuration of the components within the second information handling system. For example, the first information handling system may determine a form factor of components of an information handling system, such as hard disks, solid state drives, batteries, connectivity cards, and other information handling system components, and may determine a physical layout of the components within the second information handling system. Based on the physical configuration, such as the physical layout of the components or the form factor of the components, the first information handling system may generate a graphical representation of the physical configuration of the components within the second information handling system, such as by using pre-drawn graphics corresponding to each of the hardware components of the information handling system. For example, if the second information handling system includes a chassis with multiple slots, each slot capable of housing a component, the first information handling system may generate a graphical representation of the second information handling system showing the chassis, the slots, and any hardware components housed in the slots using a pre-drawn graphical representation of the chassis, the slots, and specific hardware components located in the slots. A user of the first information handling system may be able to view a visual representation of the second information handling system to determine the physical configuration of the second information handling system. Such a view may be particularly useful if the user of the first information handling system is monitoring or configuring the second information handling system remotely and is not present to view the physical second information handling system.

The graphical representation of the second information handling system may be further enhanced by providing one or more graphical overlays for the first graphical representation of the second information handling system generated based on component characteristics of the components of the second information handling system. The graphical representation of the first information handling system or the overlays may be interactive, allowing a user to select hardware components or sets of hardware components to cause the first information handling system to display additional information regarding the second information handling system or to configure the components of the second information handling system. Such interactivity may enhance a user experience, providing a user with a visual representation of information that may otherwise only be available by examining the information handling system in person or by navigating through a complex series of text-based menus or tables, which may confuse a user due to a lack of easy identification of a physical configuration or characteristics of the information handling system and a lack of easy identification of hot spare devices. Furthermore, text-based menus or tables may lack a convenient way to determine redundant array of independent disks (RAID) group membership of specific components, which may cause users to physically reconfigure and move disks of a system to maintain ease of organization, such as adjacent positioning of hardware components that are members of a same RAID group. Such physical reconfiguration may be time consuming and may negatively impact a user experience. As another example, text-based menus or tables may create difficulties in visualizing the form factor of slots or components of an information handling system, as an information handling system may include multiple slots with different respective form factors. When configuring information handling system components using text-based menus or tables, such menus may require a user to proceed through a series of modal prompts with different formats and states, which can cause a user to make mistakes if a user is not careful to track options that have been selected. If a user wishes to remove or physically adjust a specific component of an information handling system, it may be difficult for a user to determine which physical component corresponds to a component listed in a text-based menu or table. In some cases, a user may blink a light on the appropriate component to identify a specific component, but such activity may be less efficient than using a graphical representation to locate a specific component. As another example, system management software may restrict visibility of component or device information to text-based lists or tables, and a user may encounter difficulties in locating specific information using such tables when an information handling system houses hundreds, or more, components. Furthermore, some information, such as CXL capabilities or configuration of one or more bays of an information handling system, may be available through such text-based menus. Thus, display of a graphical representation of a second information handling system and one or more graphical overlays may allow a user to more easily configure the second information handling system and determine a status or capability of one or more components of the second information handling system.

A method may begin with determining one or more component characteristics of one or more hardware components of an information handling system. Such a method may be performed by a first information handling system, and the information handling system including the hardware components may be a second information handling system. In some embodiments, the second information handling system may be the first information handling system, while in other embodiments the second information handling system may be different from the first information handling system. For example, the component characteristics may be determined by a first information handling system by receiving the component characteristics from a second information handling system different from the first information handling system. Alternatively or additionally, the component characteristics may be determined by the second information handling system by querying one or more components of the second information handling system for component information. Component information may include component characteristics. Component characteristics may, for example, include slots in which specific hardware components are located, redundant array of independent disk (RAID) group membership of specific hardware components, hot spare statuses of specific hardware components, bay location of the specific hardware components, or compute express link (CXL) capability or status of the specific hardware components. Thus, component characteristics may, in some embodiments, include information regarding a physical configuration of the hardware components.

In some embodiments, the first information handling system may determine a physical configuration of the one or more hardware components, such as positioning of the one or more hardware components within a chassis of the second information handling system or a form factor of the one or more hardware components and may generate a first graphical representation of the physical configuration of the plurality of hardware components based on the determined physical configuration. For example, the first information handling system may determine a form factor of components of an information handling system, such as a form factor of a chassis of the information handling system or a form factor of one or more components housed within the chassis of the information handling system based on component characteristics identifying the components of the first information handling system. The first information handling system may further determine a location of each component within the second information handling system, such as a slot in which each component is located or other location information. Based on the determined physical configuration, the first information handling system may generate a first graphical representation of the components of the second information handling system, such as an image of the second information handling system including the components of the second information handling system. Such an image may, for example, be a scalable vector graphics (SVG) image of the first information handling system.

The first information handling system may generate a first graphical overlay for the first graphical representation of the physical configuration of the one or more hardware components based on the one or more component characteristics. For example, the first information handling system may determine a hot spare status of one or more components of the second information handling system and may generate a graphical overlay for the representation of each component assigned as a hot spare included in the first graphical representation.

The first information handling system may determine a selected view. For example, the graphical user interface may support multiple selected views including different overlays for the graphical representation of the physical configuration of the one or more hardware components, such as a RAID group view or a bay view. A user may select a view, and the first information handling system may display one or more overlays associated with the selected view for the user. In some embodiments, generation of the first graphical overlay may also be performed based on the selected view, while in other embodiments, multiple graphical overlays may be generated in advance for future display when a view is selected.

The first information handling system may display the first overlay and the first graphical representation based on the selected view. For example, the generated first graphical overlay may be a first graphical overlay for a RAID group view. If the RAID group view is selected, the first information handling system may display the first overlay and the first graphical representation based on the selection of the RAID group view.

In some embodiments, the first information handling system may determine RAID group membership of each of one or more hardware components and may generate a graphical overlay for the first graphical representation indicating RAID group membership of each of the one or more hardware components. In particular, when determining the selected view, the first information handling system may determine that a RAID group view is selected. Generation of the first graphical overlay may include determining one or more RAID groups to which the one or more of the hardware components belong based on the one or more component characteristics, and may generate a first graphical indication of the one or more RAID groups to which one or more of the one or more hardware components belong. The first graphical overlay may include the first graphical indication, and displaying the first graphical representation and the first graphical overlay may include overlaying the first graphical overlay on the first graphical representation on a display. In some embodiments, the first graphical indication may, for example, include highlighting for hardware components that are members of a first RAID group using a first color and highlighting for hardware components that are members of a second RAID group using a second color. Alternatively or additionally, the first graphical indication may include overlaying members of each different RAID group with a different respective pattern, or other indication.

In some embodiments, the first graphical representation of the physical configuration of the one or more hardware components may be interactive. For example, the first information handling system may receive a selection of a second graphical representation of a first hardware component of the one or more hardware components. The second graphical representation may be included in the first graphical representation. For example, the second graphical representation may be a graphical representation of a particular hardware component included in the graphical representation of the physical configuration of the one or more hardware components. A selection of the second graphical representation of the first hardware component may include user input selecting the second graphical representation. For example, a user may use a mouse to hover a cursor over or otherwise select the second graphical representation. The first information handling system may determine that the first hardware component and a second hardware component belong to a same first RAID group. For example, the first information handling system may determine additional hardware components that belong to the same RAID group as the selected first hardware component. The first information handling system may generate a second graphical overlay for the first graphical representation of the physical configuration of the one or more hardware components. The second graphical overlay may include a second graphical indication of the first RAID group including the first hardware component and the second hardware component. In some embodiments, the determination that the first hardware component and the second hardware component belong to a first RAID group and the generation of the second graphical overlay may be performed before receiving the selection of the second graphical representation. For example, the first information handling system may generate multiple respective graphical overlays for multiple respective RAID groups before receiving any user input. The first information handling system may display the second graphical overlay and the first graphical representation based on the selection of the second graphical representation of the first hardware component. For example, initially the first information handling system may display the first graphical overlay, indicating multiple RAID groups of hardware components of the second information handling system. When input from a user is received selecting a particular RAID group, the first information handling system may display a different graphical overlay over the first graphical representation specific to the selected RAID group.

The first graphical representation may be further interactive and may allow a user to configure a selected RAID group by selecting options regarding the selected RAID group. For example, the first information handling system may receive a selection of a first adjustment to a configuration of the first RAID group while the second graphical overlay and the first graphical representation are displayed. The first information handling system may then adjust the configuration of the first RAID group based on the received selection.

In some embodiments, the first graphical overlay may further indicate that one or more hardware components are not members of any RAID group. Such components may be assigned as hot spares specific to a RAID group, may be assigned as global hot spares, or may be unassigned. For example, the first information handling system may receive a selection of a second graphical representation of a first hardware component of the one or more hardware components. As discussed above, the first graphical representation may include the second graphical representation. The first information handling system may determine that the first hardware component is not a member of any of the one or more RAID groups and is not assigned as a hot spare. Based on the determination that the first hardware component is not a member of any of the one or more RAID groups and is not assigned as a hot spare, the first information handling system may display an option to assign the first hardware component as a hot spare. The first information handling system may receive a selection of the option to assign the first hardware component as a hot spare and may assign the first hardware component as a hot spare based on the received selection.

In some embodiments, the first information handling system may determine a bay in which each of one or more hardware components is located and may generate a graphical overlay for the first graphical representation indicating bays of each of the one or more hardware components. In particular, the determination of the selected view may include determining, by the first information handling system, that a bay view is selected. Generation of the first graphical overlay may include determining one or more bays in which one or more of the one or more hardware components are located based on the one or more component characteristics, and generating a first graphical indication of the one or more bays in which the one or more hardware components are located. The first graphical overlay may include the first graphical indication, and displaying the first graphical representation and the first graphical overlay may include overlaying the first graphical overlay on the first graphical representation. In some embodiments, the first graphical indication may, for example, include highlighting for hardware components that are in a first bay using a first color and highlighting for hardware components that are in a second bay group using a second color. Alternatively or additionally, the first graphical indication may include overlaying hardware components located in each different bay with a different respective pattern, or other indication.

As discussed above, the first graphical representation of the physical configuration of the one or more hardware components may be interactive. For example, the first information handling system may receive a selection of a second graphical representation of a first hardware component, where the first hardware component is located in a first bay of the one or more bays and the first graphical representation includes the second graphical representation. The first information handling system may determine a compute express link (CXL) capability of the first bay. The first information handling system may further generate a second graphical overlay for the first graphical representation of the physical configuration of the one or more hardware components that includes a second graphical indication of the first bay. The second graphical overlay may further include a third graphical indication of an option to adjust a CXL status of the first bay. The first information handling system may then display the first graphical representation and the second graphical overlay. The first information handling system may receive a selection of the third graphical indication of the option to adjust the CXL status of the first bay and may adjust the CXL status of the first bay based on the receives selection.

In some embodiments, an information handling system may include a memory and a processor for performing the methods described herein. A computer program product may include a non-transitory computer-readable medium including instructions for causing an information handling system to perform the method described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 2 is an example table-based user interface of an information handling system according to some embodiments of the disclosure.

FIG. 3 is an example graphical representation of an information handling system according to some embodiments of the disclosure.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application. The teachings can also be used in other applications and with several different types of architectures.

For purposes of this disclosure, an information handling system (IHS) may include any instrumentality or aggregate of instrumentalities operable to compute, determine, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, handheld gaming system, console gaming system, hybrid gaming system, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
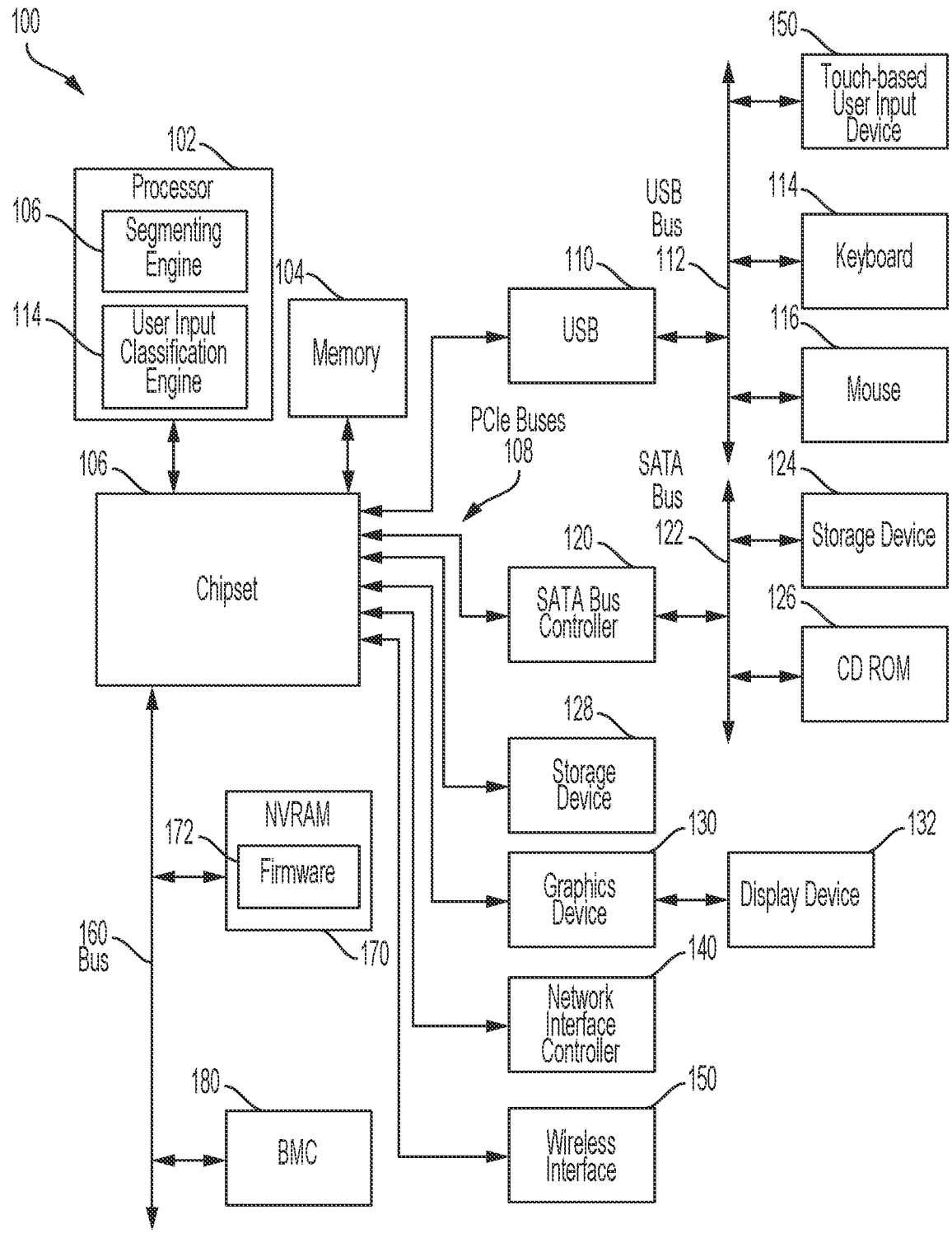
FIG. 1 is a layout of an example information handling system according to some embodiments of the disclosure.

FIG. 1 illustrates an example information handling system 100.

Information handling system 100 may include a processor 102 (e.g., a central processing unit (CPU)), a memory (e.g., a dynamic random-access memory (DRAM)) 104, and a chipset 106. In some embodiments, one or more of the processor 102, the memory 104, and the chipset 106 may be included on a motherboard (also referred to as a mainboard), which is a printed circuit board (PCB) with embedded conductors organized as transmission lines between the processor 102, the memory 104, the chipset 106, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 102, the memory 104, the chipset 106, and/or other components may be organized as a System on Chip (SoC).

The processor 102 may execute program code by accessing instructions loaded into memory 104 from a storage device, executing the instructions to operate on data also loaded into memory 104 from a storage device, and generate output data that is stored back into memory 104 or sent to another component. The processor 102 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 102 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 106 may facilitate the transfer of data between the processor 102, the memory 104, and other components. In some embodiments, chipset 106 may include two or more integrated circuits (ICs), such as a northbridge controller coupled to the processor 102, the memory 104, and a southbridge controller, with the southbridge controller coupled to the other components such as USB 110, SATA 120, and PCIe buses 108. The chipset 106 may couple to other components through one or more PCIe buses 108.

Some components may be coupled to one bus line of the PCIe buses 108, whereas some components may be coupled to more than one bus line of the PCIe buses 108. One example component is a universal serial bus (USB) controller 110, which interfaces the chipset 106 to a USB bus 112. A USB bus 112 may couple input/output components such as a keyboard 114 and a mouse 116, but also other components such as USB flash drives, or another information handling system. Another example component is a SATA bus controller 120, which couples the chipset 106 to a SATA bus 122. The SATA bus 122 may facilitate efficient transfer of data between the chipset 106 and components coupled to the chipset 106 and a storage device 124 (e.g., a hard disk drive (HDD) or solid-state disk drive (SDD)) and/or a compact disc read-only memory (CD-ROM) 126. The PCIe bus 108 may also couple the chipset 106 directly to a storage device 128 (e.g., a solid-state disk drive (SDD)). A further example of an example component is a graphics device 130 (e.g., a graphics processing unit (GPU)) for generating output to a display device 132, a network interface controller (NIC) 140, and/or a wireless interface 150 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 106 may also be coupled to a serial peripheral interface (SPI) and/or Inter-Integrated Circuit (I2C) bus 160, which couples the chipset 106 to system management components. For example, a non-volatile random-access memory (NVRAM) 170 for storing firmware 172 may be coupled to the bus 160. As another example, a controller, such as a baseboard management controller (BMC) 180, may be coupled to the chipset 106 through the bus 160. BMC 180 may be referred to as a service processor or embedded controller (EC). Capabilities and functions provided by BMC 180 may vary considerably based on the type of information handling system. For example, the term baseboard management system may be used to describe an embedded processor included at a server, while an embedded controller may be found in a consumer-level device. As disclosed herein, BMC 180 represents a processing device different from processor 102, which provides various management functions for information handling system 100. For example, an embedded controller may be responsible for power management, cooling management, and the like. An embedded controller included at a data storage system may be referred to as a storage enclosure processor or a chassis processor.

System 100 may include additional processors that are configured to provide localized or specific control functions, such as a battery management controller. Bus 160 can include one or more busses, including a Serial Peripheral Interface (SPI) bus, an Inter-Integrated Circuit (I2C) bus, a system management bus (SMBUS), a power management bus (PMBUS), or the like. BMC 180 may be configured to provide out-of-band access to devices at information handling system 100. Out-of-band access in the context of the bus 160 may refer to operations performed prior to execution of firmware 172 by processor 102 to initialize operation of system 100.

Firmware 172 may include instructions executable by processor 102 to initialize and test the hardware components of system 100. For example, the instructions may cause the processor 102 to execute a power-on self-test (POST). The instructions may further cause the processor 102 to load a boot loader or an operating system (OS) from a mass storage device. Firmware 172 additionally may provide an abstraction layer for the hardware, such as a consistent way for application programs and operating systems to interact with the keyboard, display, and other input/output devices. When power is first applied to information handling system 100, the system may begin a sequence of initialization procedures, such as a boot procedure or a secure boot procedure. During the initialization sequence, also referred to as a boot sequence, components of system 100 may be configured and enabled for operation and device drivers may be installed. Device drivers may provide an interface through which other components of the system 100 can communicate with a corresponding device. The firmware 172 may include a basic input-output system (BIOS) and/or include a unified extensible firmware interface (UEFI). Firmware 172 may also include one or more firmware modules of the information handling system. Additionally, configuration settings for the firmware 172 and firmware of the information handling system 100 may be stored in the NVRAM 170. NVRAM 170 may, for example, be a non-volatile firmware memory of the information handling system 100 and may store a firmware memory map namespace 100 of the information handling system. NVRAM 170 may further store one or more container-specific firmware memory map namespaces for one or more containers concurrently executed by the information handling system.

Information handling system 100 may include additional components and additional busses, not shown for clarity. For example, system 100 may include multiple processor cores (either within processor 102 or separately coupled to the chipset 106 or through the PCIe buses 108), audio devices (such as may be coupled to the chipset 106 through one of the PCIe busses 108), or the like. While a particular arrangement of bus technologies and interconnections is illustrated for the purpose of example, one of skill will appreciate that the techniques disclosed herein are applicable to other system architectures. System 100 may include multiple processors and/or redundant bus controllers. In some embodiments, one or more components may be integrated together in an integrated circuit (IC), which is circuitry built on a common substrate. For example, portions of chipset 106 can be integrated within processor 102. Additional components of information handling system 100 may include one or more storage devices that may store machine-executable code, one or more communications ports for communicating with external devices, and various input and output (I/O) devices, such as a keyboard, a mouse, and a video display.

In some embodiments, processor 102 may include multiple processors, such as multiple processing cores for parallel processing by the information handling system 100. For example, the information handling system 100 may include a server comprising multiple processors for parallel processing. In some embodiments, the information handling system 100 may support virtual machine (VM) operation, with multiple virtualized instances of one or more operating systems executed in parallel by the information handling system 100. For example, resources, such as processors or processing cores of the information handling system may be assigned to multiple containerized instances of one or more operating systems of the information handling system 100 executed in parallel. A container may, for example, be a virtual machine executed by the information handling system 100 for execution of an instance of an operating system by the information handling system 100. Thus, for example, multiple users may remotely connect to the information handling system 100, such as in a cloud computing configuration, to utilize resources of the information handling system 100, such as memory, processors, and other hardware, firmware, and software capabilities of the information handling system 100. Parallel execution of multiple containers by the information handling system 100 may allow the information handling system 100 to execute tasks for multiple users in parallel secure virtual environments.

An information handling system may include multiple hardware components, such as SSDs, hard disks, connectivity cards, graphics processing units (GPUs), batteries, field programmable gate arrays (FPGAs), and other hardware components. In some embodiments, an information handling system may include multiple slots for housing hardware components, and in some embodiments, an information handling system may house more than one hundred components. Hardware components of an information handling system may also include a chassis of an information handling system, one or more bays of an information handling system, or one or more slots of an information handling system. Information handling systems may include bays, which may include one or more slots. In some embodiments, different bays, slots located in the different bays, may have different capabilities. For example, some slots of an information handling system or hardware components located in slots of an information handling system may have different form factors, may belong to different storage domains, and may support different technology types. As one example, some slots or hardware components may support series attached small computer system interface (SAS) storage and connectivity and may have a first form factor, while other slots or hardware components may support M.2 storage and connectivity and may have a second, different, form factor. As another example, some bays, and slots located therein, may support CXL, while other bays or slots may not. Enabling or disabling CXL functionality in a bay that supports CXL may, in table-based GUIs, require navigation through a complex series of prompts and menus. In some cases, information handling systems may have multiple hardware components, such as slots, labeled with a same number, such as 0 or 1, and hardware components sharing a same number may even be located on a same visual plane. As another example, backplanes of an information handling system may include bays that have 40, 24, 8, 4 or another number of slots. Some information handling systems may not include physical dividers, such as sheet metal dividers, indicating where one bay, with slots having a first set of capabilities, ends and another bay, with slots having a second set of capabilities, begins. Some information handling systems may support enterprise and data center solid state drive form factor (EDSFF), and may include hardware components with a same or similar form factor, but different functions, such as dynamic random access memory (DRAM) hardware components, FPGA hardware components, general purpose GPU (GPGPU) hardware components, and other hardware components. Furthermore, slots and bays that house EDSFF hardware components may be updated over time, such as through firmware updates, and may thus have different capabilities depending on an update status of each individual slot or bay. Viewing a physical front of an information handling system may not provide sufficient information to a user of the information handling system regarding hardware component status or functionality. For example, viewing a physical front of an information handling system may not allow a user to determine capabilities or firmware update status of bays or slots of an information handling system. Furthermore, packaging of an information handling system may not provide up to date information regarding capabilities of bays or slots of the information handling system due to firmware updates performed after printing of the packaging. As another example, viewing a physical information handling system, packaging, or user interface may not provide a user with information regarding whether a backplane or one or more bays of the information handling system supports one or more upgrades, such as an upgrade to a faster bus speed (e.g., an upgrade from SAS to nonvolatile memory express (NVMe)).

An example table-based user interface 200 is shown in FIG. 2. The user interface 200 may be a table with multiple entries 202A-F providing information about hardware components of an information handling system. For example, entry 202A may provide information regarding a first solid state drive, entry 202B may provide information regarding a first solid state disk, entry 202C may provide information regarding a second solid state disk, entry 202D may provide information regarding a first physical disk, entry 202E may provide information regarding a second physical disk, and entry 202F may provide information regarding a third physical disk. The user interface 200 may include information such as a status of each hardware component, a name of each hardware component, a state of each hardware component, a slot number in which each hardware component is located, a storage capacity or size of each hardware component, a security status of each hardware component, bus protocol of each hardware component, a media type of each hardware component, a hot spare status of each hardware component, a remaining rated write endurance of each hardware component, and pending actions for each hardware component. Such information elements may, for example, be component characteristics of the respective hardware components. As shown in the user interface 200, multiple components may share a same slot number, and the shared slot number may make it difficult for a user to determine a physical configuration of the hardware components using the table-based user interface 200. Furthermore, the table-based user interface 200 may not provide information regarding bay location or RAID membership of the hardware components in a same view as the information shown in the user interface 200 of FIG. 2. The table-based user interface 200 may provide hot spare status, as shown in FIG. 2, but may not provide a user with information regarding whether a hot spare is assigned to one or more specific RAIDs of the information handling system or to the information handling system in general or information regarding whether there is a hot spare available in a same view with the information shown in FIG. 2. If a table-based user interface 200 does include information regarding bays of an information handling system, and bay capabilities, determining such information may require a user to navigate a complicated table, that may include information for up to 40 or more slots having five or more different technology types and capabilities. The user interface 200 may also provide actions to allow a user to select one or more changes to a configuration of each of the hardware components. However, a user may be unaware of a context of each of the hardware components given the lack of information regarding positioning of the components within the information handling system or RAID membership of each of the hardware components. Furthermore, selection of an action may require a user to select multiple options, navigating through a complex set of menus to change a configuration of a component.

Generation and display of a graphical representation of a physical configuration of hardware components of an information handling system may provide a user with additional contextual information regarding the information handling system enhancing a user experience and reducing user error when adjusting configuration of the information handling system. An example graphical user interface 300 including a graphical representation 304 of a physical configuration of hardware components of an information handling system is shown in FIG. 3. The graphical representation 304 of a physical configuration of hardware components of an information handling system may be a graphical representation of the information handling system. The graphical representation 304 of the information handling system may include graphical representations 302A-Z of a plurality of hardware components of the information handling system, such as a plurality of hardware components housed in slots or a plurality of slots. For example, the graphical representation 304 of the information handling system may include graphical representations 302A-D, F-N, and P-Z of hardware components housed in slots of the information handling system. The graphical representation 304 may further include graphical representations 302E, N of empty slots that do not currently house other hardware components. The graphical representation 304 may be generated using information retrieved from the information handling system including the components shown in graphical representations 302A-Z. For example, the graphical representation 304 may be updated when a component is removed or changed to reflect the change. As one example, when generating the graphical representation 300, an information handling system may query one or more hardware components, such as a backplane of the information handling system, one or more bays of the information handling system, or the one or more hardware components shown in graphical representations 302A-Z, to determine a physical configuration of the one or more hardware components, such as which hardware components are housed in which slots of the information handling system. The physical configuration may, for example, be determined based on component characteristics received from the hardware components, such as a form factor of the hardware components, a function of the hardware components, a location of the hardware components within the information handling system, and other component characteristics. In some embodiments, the information handling system shown in the graphical representation 304 may generate the graphical representation. In some embodiments, the information handling system shown in the graphical representation 304 may provide information regarding the physical configuration of the one or more hardware components, such as component characteristics of the hardware components, to a different information handling system, and the different information handling system may generate or display the graphical representation 304. For example, the graphical representation 304 may be displayed on a display of a remote tablet, laptop, smart phone, or other information handling system, or may be displayed on a display of the information handling system of the graphical representation 304. The graphical representation 304 may provide a user with additional context regarding information handling system component physical configuration not present in the table-based graphical user interface of FIG. 2. For example, a user may, at a glance, determine which slots of the information handling system house hardware components and which are empty. In some embodiments, a user may determine which hardware components are located in which slots of the information handling system. As another example, a remote user of a second information handling system may view the graphical representation 304 to determine a location of a particular component to be adjusted and may communicate with an on-site user using the reference of the graphical representation 304 reflecting the physical configuration viewed by the on-site user.

Figure 4:
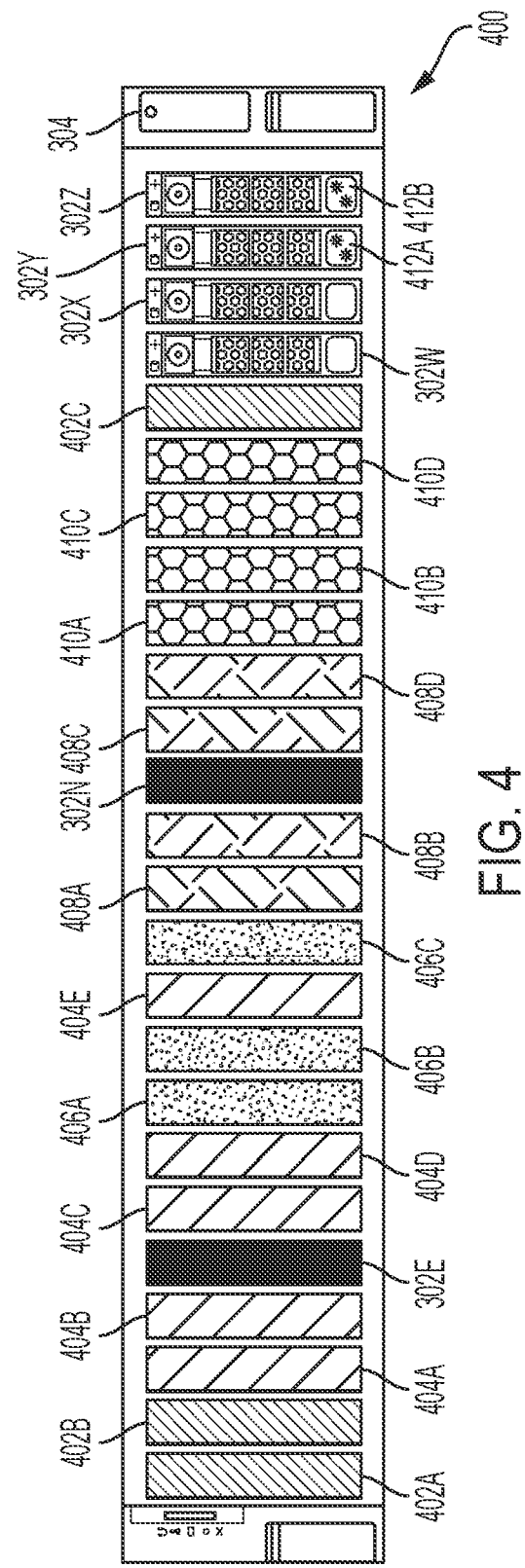
FIG. 4 is an example graphical representation of an information handling system with an overlay indicating membership of hardware components in a plurality of RAID groups according to some embodiments of the disclosure.

Generation and display of overlays for a graphical representation of an information handling system may provide a user with additional contextual information regarding the information handling system and the hardware components of the information handling system. Such additional information may enhance a user experience, allowing the user to determine information regarding the information handling system quickly without requiring navigation of an extensive series of menus. An example graphical user interface 400 including an overlay displayed along with a graphical representation 304 of an information handling system is shown in FIG. 4. The graphical user interface 400 including the overlay may provide a user with information regarding RAID group membership of the hardware components of the information handling system shown in the graphical representation 304. RAID group membership may also be referred to as virtual disk membership. A first graphical overlay may include graphical overlay components 402A-C, 404A-E, 406A-C, 408A-D, 410A-D, and 412A-B. Graphical overlay components 402A-C may overlay graphical representations of hardware components that are members of a first RAID group, such as graphical representations 302A-B, V of FIG. 3. Graphical overlay components 404A-E may overlay graphical representations of hardware components that are members of a second RAID group, such as graphical representations 302C-D, F-G, J of FIG. 3. Graphical overlay components 406A-C may overlay graphical representations of hardware components that are members of a third RAID group, such as graphical representations 302H-I, K of FIG. 3. Graphical overlay components 408A-D may overlay graphical representations of hardware components that are members of a fourth RAID group, such as graphical representations 302L-M, O-P of FIG. 3. Graphical overlay components 410A-D may overlay graphical representations of hardware components that are members of a fifth RAID group, such as graphical representations 302Q-T of FIG. 3. Graphical overlay components 412A-B may overlay hardware components that are assigned as hot spares, such as universal hot spares or RAID group-specific hot spares. For example, graphical overlay components 412A-B may overlay graphical representations 302Y-Z of FIG. 3. Graphical overlay components 402A-C, 404A-D, 406A-C, 408A-D, 410A-D, and 412A-B may, together, form a first graphical overlay for the graphical representation 304 of the physical configuration of the hardware components. The first graphical overlay may be generated based on component characteristics, such as RAID group membership or hot spare status of each of the hardware components. Each of the graphical overlay components 402A-C, 404A-D, 406A-C, 408A-D, 410A-D, and 412A-B may correspond to a respective hardware component shown in the graphical representation 304 of the information handling system. The graphical overlay components 402A-C, 404A-D, 406A-C, 408A-D, 410A-D, and 412A-B may be opaque, such as filled with a particular color or pattern corresponding to each RAID group. As another example, the graphical overlay components 402A-C, 404A-D, 406A-C, 408A-D, 410A-D, and 412A-B may each comprise a solid line, of a color corresponding to the respective RAID group of the underlying hardware component, outlining the graphical representations of each corresponding hardware component, but may allow a user to view the respective graphical representations of the hardware components within the solid outline. In some embodiments, as shown with graphical overlay components 412A-B indicating hot spare status of the hardware components shown in graphical representations 302Y-Z, the overlay components may include graphical icons covering all or a portion of the respective graphical representations of the hardware components. The graphical overlay components 402A-C, 404A-D, 406A-C, 408A-D, 410A-D, and 412A-B may be semitransparent or transparent, such as highlighting graphical representations of particular hardware components that belong to particular RAID groups in particular colors, but allowing a user to view the hardware component through the highlighting. For example, graphical representations of hardware components that belong to a first RAID group may be highlighted by overlay components 402A-C in a first color, such as yellow. A color may be assigned to each RAID group, and graphical overlay components highlighting graphical representations of particular hardware components in particular colors may allow a user to quickly determine RAID group membership of all hardware components that are RAID group members. Graphical representations of hardware components that are not members of a RAID group and are not assigned as hot spares may, in some embodiments, not be overlaid by the first graphical overlay. For example, empty slots 302E, 302N may not be members of a RAID group, may not be assigned as hot spares, and may thus not be overlaid by any overlay components. Similarly, hardware components represented by graphical representations 302W-X may not be assigned as hot spares or assigned as members of RAID groups and may thus not be overlaid by any overlay components. Thus, graphical overlays overlaid on a graphical representation of a physical configuration of hardware components of an information handling system may provide additional contextual information, such as information regarding RAID membership, to a user viewing the graphical user interface 400.

Figure 5:
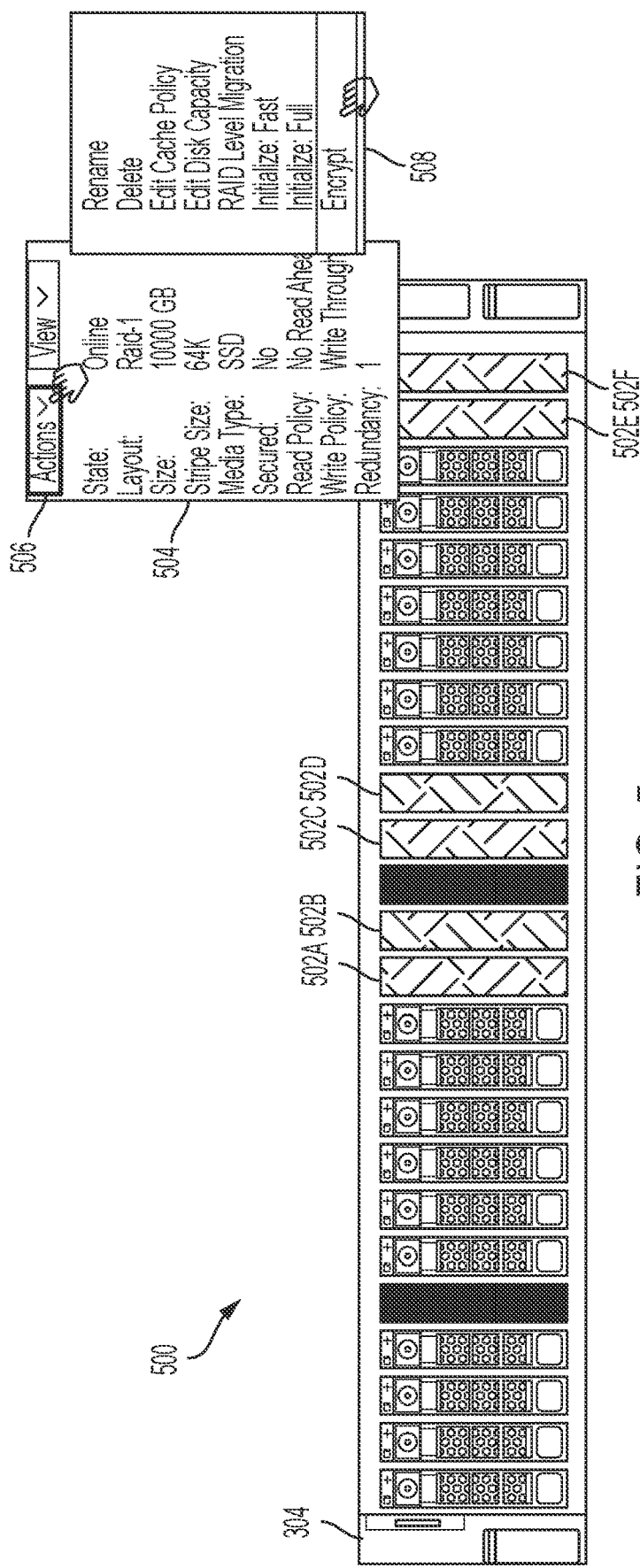
FIG. 5 is an example graphical representation of an information handling system with an overlay indicating membership of a plurality of hardware components in a single RAID group along with a RAID group information and configuration window according to some embodiments of the disclosure.

Overlays for a graphical representation of a physical configuration of hardware components of an information handling system may be interactive, providing a user with multiple layers of information regarding the hardware components. In some embodiments, an information handling system may generate multiple overlays based on component characteristics of hardware components of an information handling system, such as overlays for specific RAID groups of an information handling system. An example graphical user interface 500 including a graphical overlay for a first RAID group and a graphical representation 304 of an information handling system is shown in FIG. 5. The overlay may include overlay components 502A-F and may indicate hardware components of the information handling system depicted by graphical representation 304 that are members of a first RAID group. For example, the overlay of FIG. 4 may replace the overlay of FIG. 3 on the display of the graphical representation 304 of the information handling system when a user selects a graphical representation of a hardware component that is a member of the first RAID group, such as a graphical representation of a hardware component overlaid with an overlay component of a first graphical overlay. For example, to select a hardware component a user may hover a cursor over the graphical representation of the hardware component or may otherwise select the graphical representation of the hardware component, such as by clicking the hardware component. The graphical overlay for the first RAID group may further include a first window 504 of information about the first RAID group. The first window 504 may, for example, include information regarding a status of the first RAID group, such as online or offline, information regarding a layout of the first RAID group, information regarding a storage size of the first RAID group, information regarding a stripe size of the first RAID group, information regarding a media type of the first RAID group, information regarding a security status of the first RAID group, information regarding a read policy of the first RAID group, information regarding a write policy of the first RAID group, and information regarding redundancy of the first RAID group. The first window 504 may also include an option 506 to perform one or more actions on the first RAID group and an option to change a view. If a user selects the option 506 to perform one or more actions on the first RAID group, such as by clicking or hovering over the option 506, a window 508 of configuration options may be displayed. The window 508 may include an option to rename the RAID group, an option to delete the RAID group, an option to edit a cache policy of the RAID group, an option to edit a disk capacity of the RAID group, an option to perform a RAID level migration on the RAID group, an option to initialize a fast status on the RAID group, an option to initialize a full status on the RAID group, and an option to encrypt the RAID group. If a user selects an option from the window 508, the information handling system may change a configuration of the RAID group based on the selected option. In some embodiments, the information handling system may request that a user confirm the selected option before changing the configuration of the RAID group.

Figure 6:
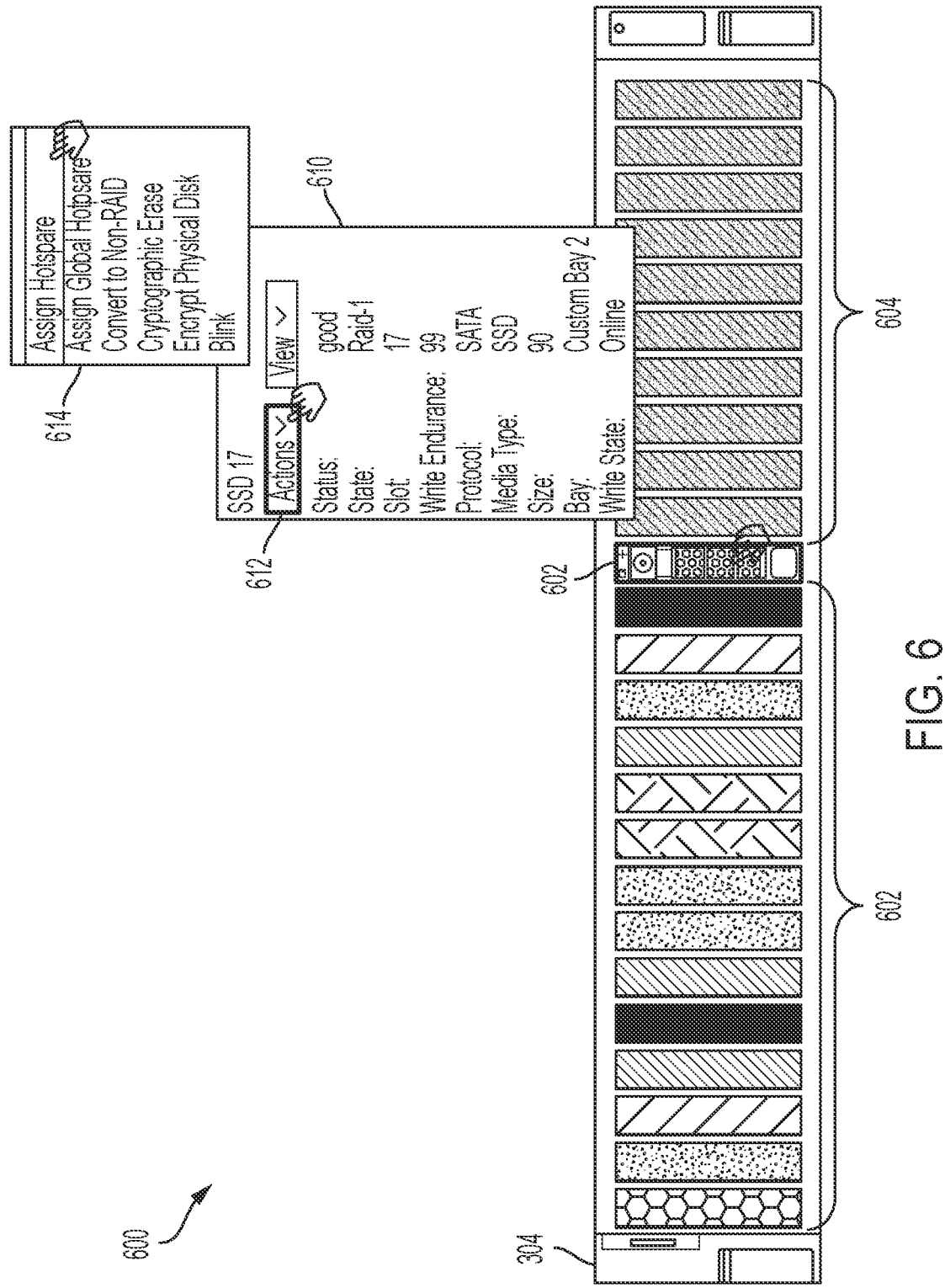
FIG. 6 is an example graphical representation of an information handling system with an overlay indicating a hardware component that is not a member of a RAID group along with a hardware component information and configuration window according to some embodiments of the disclosure.

When a RAID group view is selected, but a hardware component corresponding to a selected graphical representation of an information handling system hardware component is not a member of a RAID group, a third overlay may be displayed indicating the selected information handling system hardware component that is not a member of a RAID group. An example graphical user interface 600 including such a third overlay and a graphical representation 304 of an information handling system is shown in FIG. 6. For example, as discussed with respect to FIG. 4, a first overlay may be displayed indicating RAID group membership of information handling system hardware components. If a user selects a graphical representation 602 of a first hardware component included in the graphical representation 304 of the physical layout of the first information handling system, such as by hovering a cursor over the graphical representation of the first hardware component or clicking on the graphical representation of the first hardware component, the first overlay may be adjusted to indicate selection of the first hardware component. For example, graphical overlay elements 602, 604 overlaid on graphical representations of hardware components other than the selected hardware component may be greyed out or otherwise adjusted to indicate selection of the first hardware component. Thus, the first graphical overlay may, in some embodiments, be altered such as by fading color highlighting for unselected graphical representations of hardware components. In some embodiments, the graphical representation 602 of the first hardware component may be highlighted, such as with a bold border or other graphical indication. Thus, for example, if graphical representations of members of multiple RAID groups were highlighted with different respective colors, as described with respect to FIG. 4, the highlighting may be greyed out or faded. Furthermore, overlay components including greyed out or faded highlighting may be overlaid on graphical representations of other information handling system hardware components that are not members of RAID groups but are also not selected by the user. Information regarding the hardware component corresponding to the selected graphical representation 602 of a hardware component may be displayed in a window 610 upon selection of the graphical representation 602. Such information may include a status of the hardware component, a state of the hardware component, a slot number in which the hardware component is located, a write endurance of the hardware component, a protocol of the hardware component, a media type of the hardware component, a size of the hardware component, a bay in which the hardware component is located, and a blink state of the hardware component. The window 610 may include a first option 612 to perform one or more actions, such as to perform one or more configuration changes on the first hardware component and a second option to adjust a view. When a user selects the first option 612, such as by clicking on the first option 612, a second window 614 may be displayed. The second window 614 may include a list of actions that may be performed on the first hardware component, such as a list of configuration changes that may be performed on the first hardware component. Such actions may include assigning the first hardware component as a RAID-specific hot spare, assigning the first hardware component as a global hot spare, converting the first hardware component to a non-RAID hardware component, performing a cryptographic erase on the first hardware component, encrypting a physical disk of the first hardware component, or causing a light of the first hardware component to blink. When a user selects one of the actions of the second window 614, the information handling system may request confirmation from the user that the user would like to perform the action. When the confirmation is received, the information handling system may perform the selected action. Thus, a user may, for example, assign a specific hardware component as a hot spare with four inputs, selecting the first hardware component, selecting an option to perform one or more actions on the first hardware component, selecting an option to assign the first hardware component as a hot spare, and confirming selection of the option to assign the first hardware component as a hot spare. Graphical overlays may enable a user to easily determine a component that a user is configuring and to select configuration changes without navigating complex multi-level menus.

Figure 7:
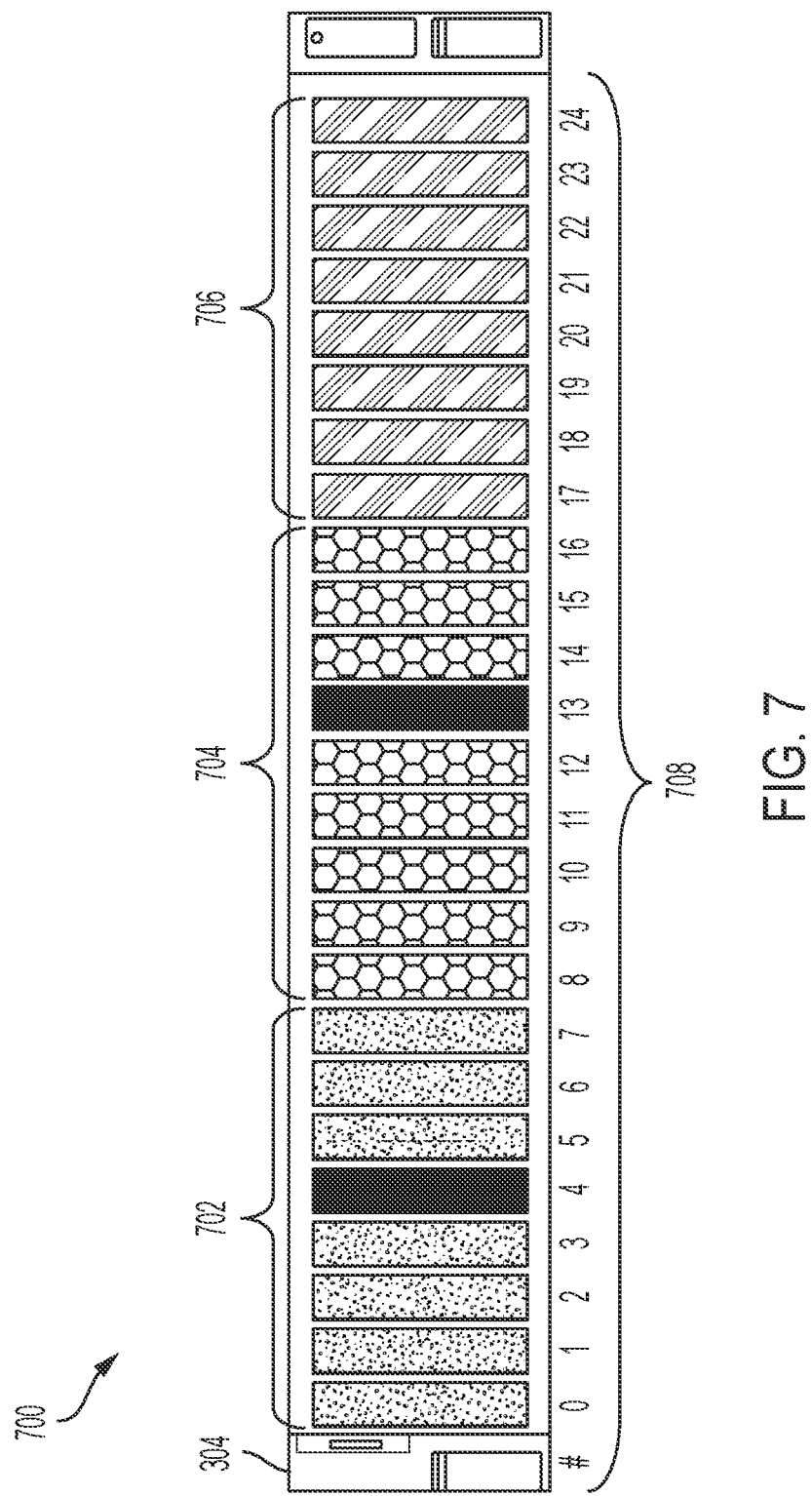
FIG. 7 is an example graphical representation of an information handling system with an overlay indicating location of a plurality of hardware components in a plurality of bays according to some embodiments of the disclosure.

In some embodiments, a graphical overlay for a graphical representation of a physical configuration of hardware components of an information handling system may indicate bays in which the hardware components of the information handling system are located. An example graphical user interface 700 including a graphical representation 304 of a physical configuration of hardware components of the information handling system and a graphical overlay indicating bay location of the information handling system hardware components is shown in FIG. 7. An information handling system, such as the information handling system depicted in the graphical representation 304 or another information handling system, may determine component characteristics related to bay location of hardware components of the information handling system. For example, the information handling system may determine a bay location of multiple hardware components of the information handling system. In some embodiments, the information handling system may determine a bay in which each slot of an information handling system is located and may determine hardware components located in one or more of the slots. Based on a bay in which a slot is located and a hardware component located in the slot, the information handling system may determine a bay in which a hardware component is located. The information handling system may then generate a graphical overlay, as shown in FIG. 7, indicating bays in which hardware components are located. A graphical overlay indicating bays in which hardware components are located may include multiple graphical overlay components 702, 704, 706. A first graphical overlay component 702 may indicate hardware components located in a first bay of the information handling system. For example, the first graphical overlay component 702 may overlay graphical representations of information handling system hardware components of the graphical representation 304 that represent information handling system components that are located in the first bay. As one example, the first graphical overlay component 702 may overlay graphical representations 202A-202H of FIG. 3. In some embodiments, hardware components may include empty slots, such as empty slot 202E, and such empty slots may be overlaid by the first graphical overlay component 702. A second graphical overlay component 704 may indicate hardware components located in a second bay of the information handling system. For example, the second graphical overlay component 704 may overlay graphical representations of information handling system components of the graphical representation 304 that represent information handling system components that are located in the second bay. As one example, the second graphical overlay component 704 may overlay graphical representations 2021-202R of FIG. 3. A third graphical overlay component 704 may indicate hardware components located in a third bay of the information handling system. For example, the third graphical overlay component 704 may overlay graphical representations of information handling system components of the graphical representation 304 that represent information handling system components that are located in the third bay. As one example, the third graphical overlay component 706 may overlay graphical representations 202S-202Z of FIG. 3. Thus, the graphical overlay of FIG. 7 may include multiple graphical overlay components 702, 704, 706 indicating bays in which hardware components of an information handling system are located.

The first graphical overlay component 702 may, for example, highlight graphical representations of hardware components located in a first bay with a first color, place a first color border around graphical representations of hardware components located in the first bay, overlay graphical representations of hardware components located in a first bay with a first pattern, or otherwise indicate that graphical representations of hardware components located in a first bay are located in a first bay. The second overlay component 704 and the third overlay component 706 may similarly indicate that hardware components are located in their respective bays using different, colors, borders, or patterns. In some embodiments, the overlays 702, 704, 706 may be opaque, while in other embodiments the overlays 702, 704, 706 may be transparent or semi-transparent. In some embodiments, a graphical overlay or a graphical representation of a physical configuration of hardware components of an information handling system may include numbering 708 indicating slot numbers of multiple graphical representations of slots of an information handling system. Thus, a graphical overlay for a graphical representation of a physical configuration of an information handling system may enable a user to easily determine a bay or slot in which a hardware component is located.

Figure 8:
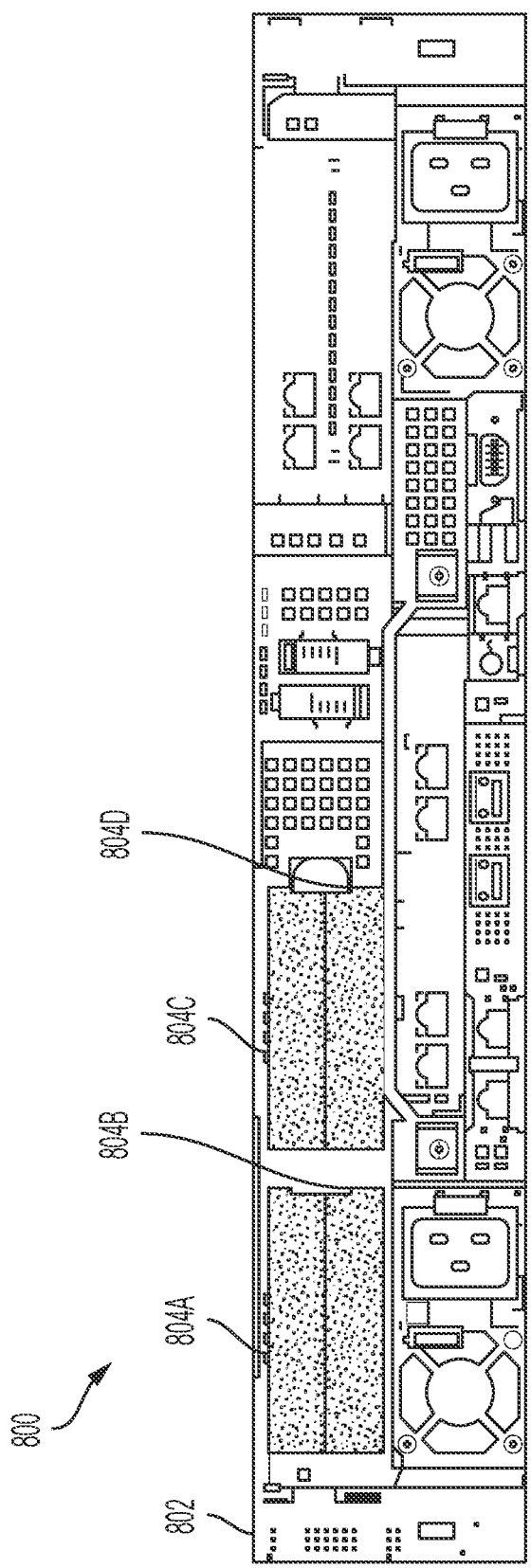
FIG. 8 is an example graphical representation of a back panel of an information handling system with an overlay indicating location of a plurality of hardware components in a bay according to some embodiments of the disclosure.

In some embodiments, an information handling system may include slots for hardware components in locations other than a front of an information handling system, such as at a back of the information handling system. Thus, an information handling system may generate a second graphical representation 802 of a physical configuration of hardware components for a different face of an information handling system, such as a back of the information handling system, as shown in FIG. 8. In some embodiments, one or more front bays may be located on a front face of an information handling system, one or more rear bays may be located on a rear face of an information handling system, and one or more mid-bays may be located in a mid-section of an information handling system. The graphical user interface 800 of FIG. 8 may further include an overlay, such as described with respect to FIG. 7, indicating bay location of hardware components graphical representations of which included in the graphical representation 802. For example, overlay components 804A-D may indicate that the underlying hardware components are located in a first bay. In some embodiments, a first bay many include hardware components positioned on a front of an information handling system and a back of an information handling system. Thus, the graphical representations and overlays of FIGS. 7 and 8 may be used to determine all hardware components located in a first bay. RAID overlays, as described with respect to FIGS. 4-6 may also be overlaid on graphical representations of different faces of an information handling system.

Figure 9:
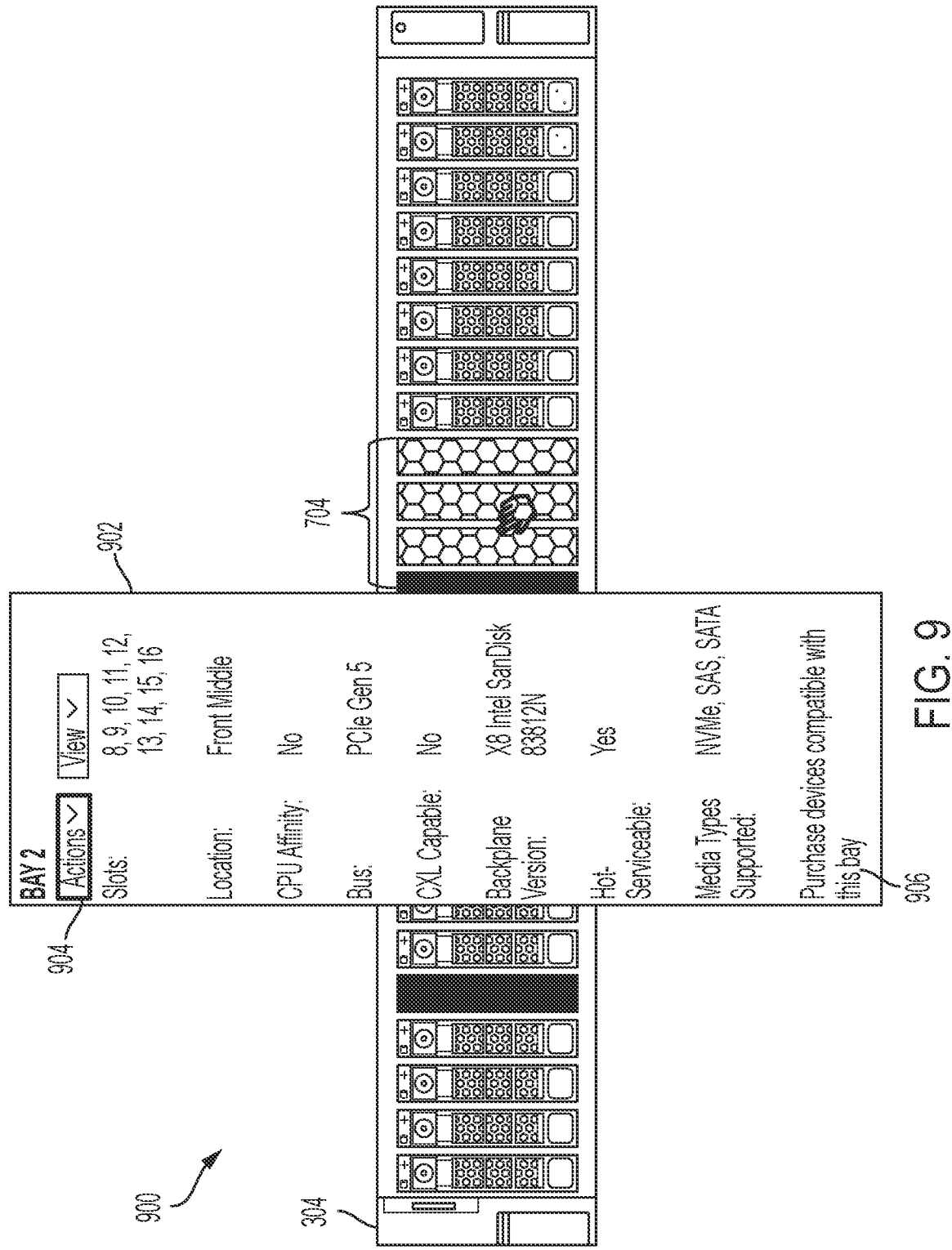
FIG. 9 is an example graphical representation of an information handling system with an overlay indicating hardware components located in a first bay along with a bay information and configuration panel according to some embodiments of the disclosure.

Graphical overlays indicating specific bays may be generated and displayed for a user as well. For example, when a user selects a graphical representation of a hardware component located in a second bay, as shown in FIG. 7, such as by hovering a cursor over the graphical representation of the hardware component or clicking on the graphical representation of the hardware component, a second overlay may be displayed, as shown in graphical user interface 900 of FIG. 9. As one example, the second overlay component 704, of FIG. 7, may be maintained, overlaid on the graphical representation 304 of the physical configuration of the hardware components of the information handling system, while additional information, such as a window 902 may be displayed for a user. The window 902 may, for example, include a list of slots located in the second bay, a physical location of the second bay, a CPU affinity status of the second bay, a bus technology of the second bay, a CXL capability of the second bay, a backplane version of the second bay, a hot-serviceable status of the second bay, and media types supported by the second bay. In some embodiments, an option 904 to perform one or more actions, such as to make one or more changes to a configuration of the second bay, may be included in the second overlay. In some embodiments, the second overlay may include an option 906 to purchase devices that are compatible with the selected bay. For example, the information handling system, or another information handling system, may determine one or more characteristics of the second bay, such as a bus technology used in the second bay, a form factor of slots of the second bay, a backplane version of the second bay, and media types supported by the second bay and may determine one or more hardware components compatible with the second bay. When the user selects the option 906, the user may be presented with a list of compatible devices to purchase. Thus, a second overlay may present a user with specific information about a bay, may allow a user to adjust a configuration of a bay, and may allow a user to view devices that are compatible with the bay for purchase.

Figure 10:
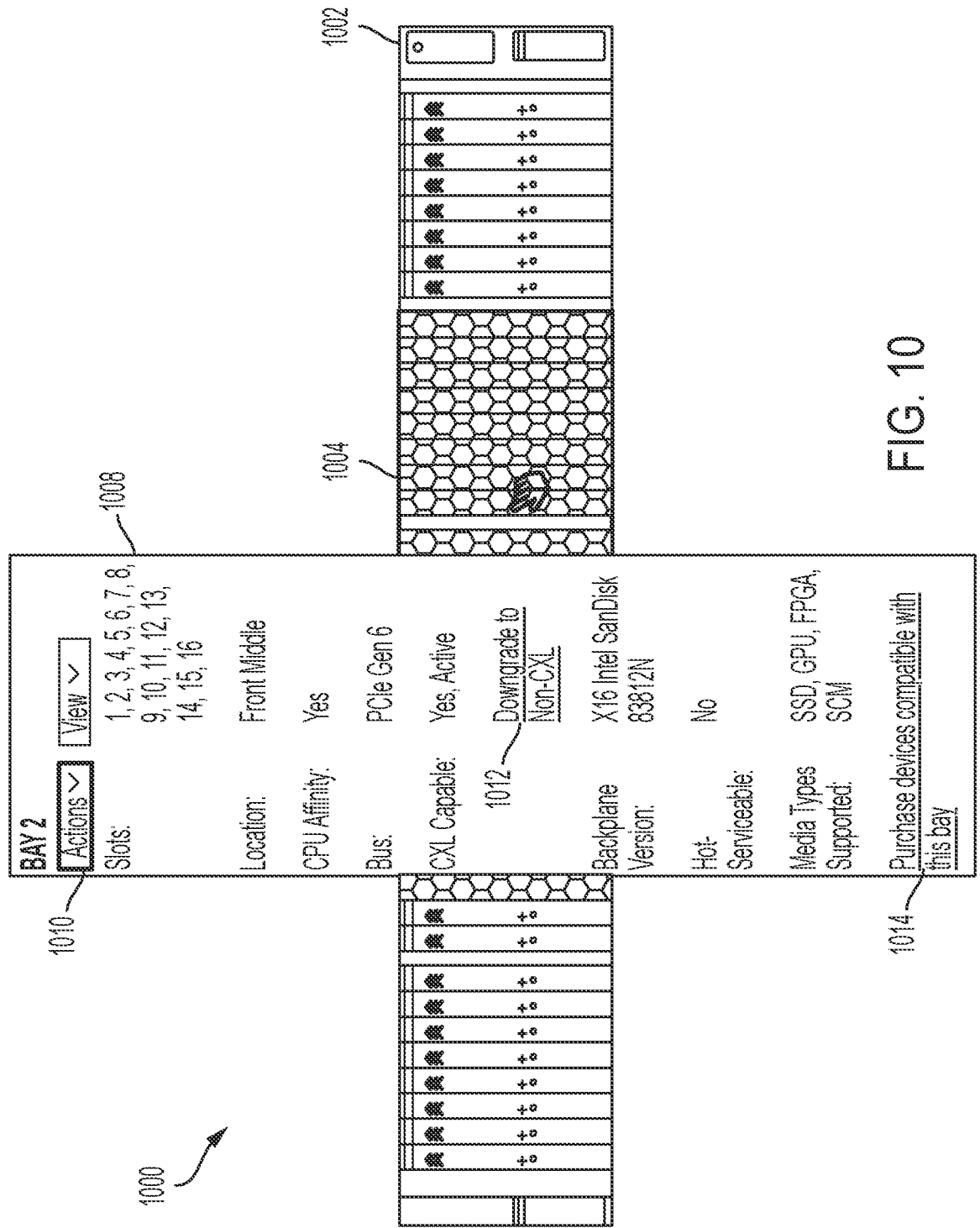
FIG. 10 is an example graphical representation of an information handling system with an overlay indicating hardware components located in a first CXL-enabled bay along with a bay information and configuration panel according to some embodiments of the disclosure.

Some information handling systems may include slots and other hardware components with different form factors. As shown in FIG. 10, a graphical representation 1002 of a physical configuration of hardware components of an information handling system may be generated to show the form factor of the hardware components. Furthermore, the graphical user interface 1000 of FIG. 10 may also include an overlays similar to the overlays discussed with respect to FIGS. 4-9. For example, FIG. 10 shows a second overlay, similar to the second overlay discussed with respect to FIG. 9, where a user has selected a graphical representation of a hardware component located in a particular bay. As discussed with respect to FIG. 9, the second overlay may include the first overlay component 1004 along with a window 1008 indicating information about the bay. The window 1008 may include an option to perform one or more actions with respect to the bay, such as to adjust a configuration of the bay, and an option 1014 to view devices compatible with the selected bay for purchase. The selected bay indicated by overlay component 1004 of FIG. 10 may be CXL compatible and may thus include an option 1012 to adjust a CXL status of the bay. For example, a user may select the option 1012 to downgrade the bay to a non-CXL status. As another example, if the bay is upgradeable to CXL status, the option 1012 may allow the user to upgrade the bay to CXL status. Thus, the graphical overlay of FIG. 10 may allow a user to easily view and adjust a CXL status of a selected bay.

Figure 11:
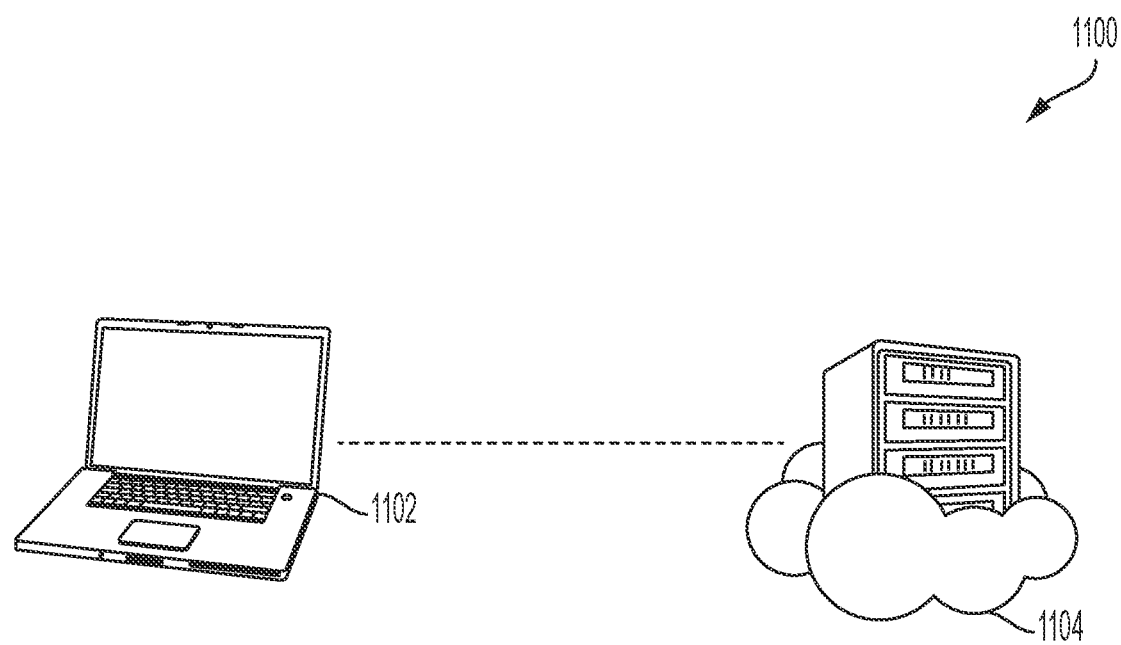
FIG. 11 is an example system for generation of graphical representations of physical configurations of information handling system hardware components and overlays according to some embodiments of the disclosure.

An example system 1100 for generation and display of graphical representations of physical configurations of hardware components of an information handling system 1104 and accompanying overlays is shown in FIG. 11. In some embodiments, an information handling system 1104 including the hardware components to be represented in the graphical representation may generate and display the graphical representations and overlays. For example, the information handling system 1104 may determine component characteristics by querying hardware components of the information handling system for component characteristics of hardware components of the information handling system 1104 and may generate graphical representations or overlays based on the component characteristics. In some embodiments, a different information handling system 1102, such as a remote connected information handling system, may generate or display the graphical representations and overlays discussed herein. For example, the information handling system 1102 may connect to the information handling system 1104 to receive component characteristics of hardware components of the information handling system 1104 for generation of graphical representations and overlays. The information handling system 1104 may generate graphical representations and overlays and may display such graphical representations and overlays on a display of the information handling system 1102. Alternatively or additionally, the information handling system 1104 may generate the graphical representations and overlays and may transmit the graphical representations and overlays to the information handling system 1102 for display on a display of the information handling system 1102. In such embodiments, displaying the graphical representations and overlays may be transmitting the graphical representations and overlays to the information handling system 1102 for display.

Figure 12:
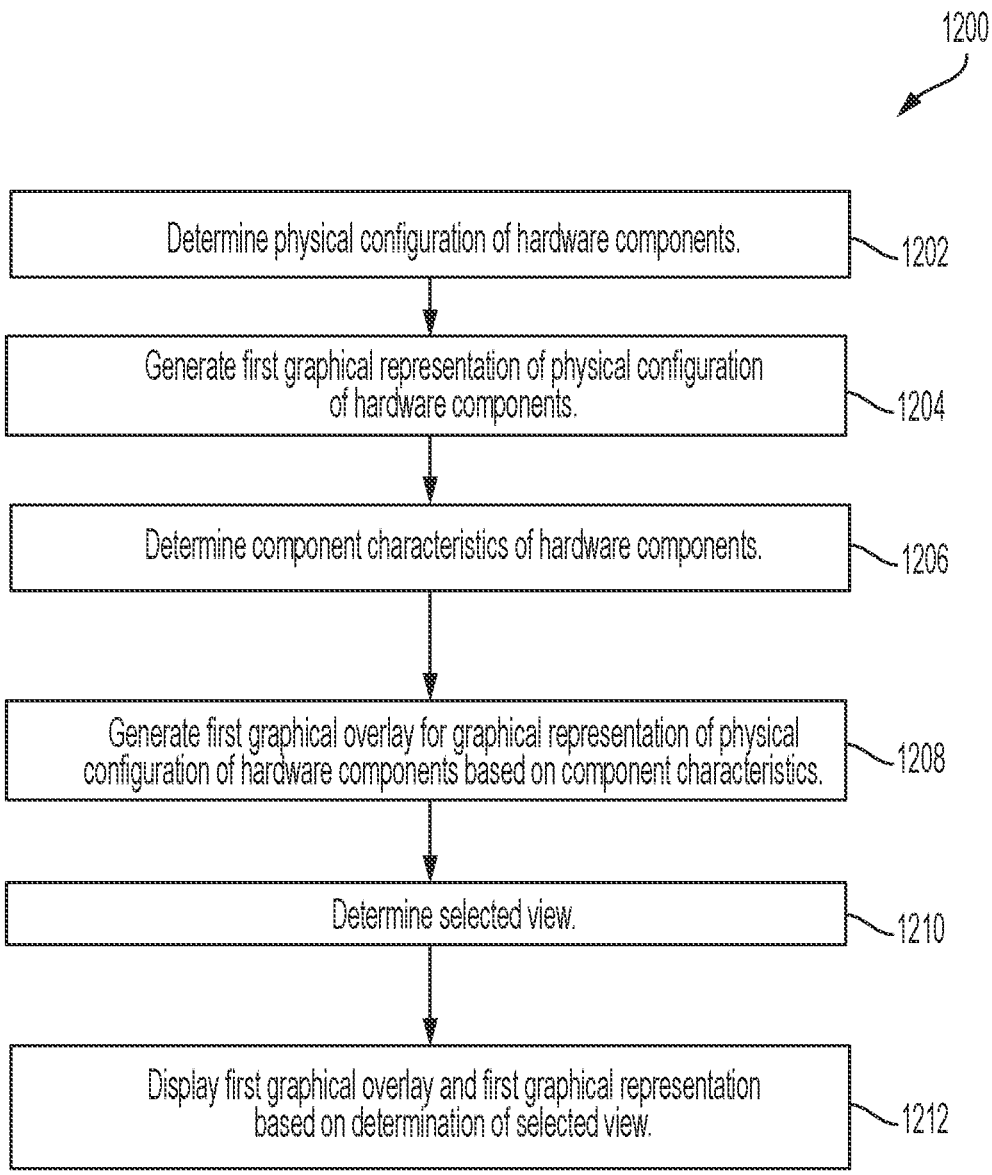
FIG. 12 is a flow chart of an example method for generation of graphical representations of information handling system components and overlays according to some embodiments of the disclosure.

A first information handling system may perform a method 1200 for generation and display of graphical representations and overlays for a physical configuration of hardware components of a second information handling system as shown in FIG. 12. In some embodiments, the first information handling system and the second information handling system may be a same information handling system, while in other embodiments the first information handling system may be different from the second information handling system. The method 1200 may begin, at block 1202, with determination of a physical configuration of hardware components. For example, the first information handling system may determine a form factor of one or more hardware components of the second information handling system, may determine information for slots of the second information handling system, such as a total number of slots and numbering of each of the slots, and hardware components located in the slots of the second information handling system, may determine a positioning or form factor of slots of the second information handling system, may determine a function of hardware components of the second information handling system, may determine slots of the second information handling system that are empty, or may determine other information related to a physical configuration of the hardware components of the second information handling system. Determination of the physical configuration of hardware components may be performed based on component characteristics of the hardware components, as discussed with respect to block 1206. Determination of the physical configuration of the hardware components may include determining what hardware components are present in the second information handling system. For example, the first information handling system may perform back end discovery of hardware components and a physical configuration of hardware components to determine which specific hardware components are present in the second information handling system and where the specific hardware components are located in the second information handling system.

At block 1204, the first information handling system may generate a graphical representation of the physical configuration of the hardware components of the second information handling system. For example, the graphical representation may show one or more slots of the second information handling system, one or more hardware components located in the one or more slots of the second information handling system, one or more empty slots of the second information handling system, form factors of slots of the second information handling system, form factors of hardware components of the second information handling system, numbers of slots of the second information handling system, and other physical configuration details of the second information handling system. In some embodiments, generating the graphical representation of the physical configuration of the hardware components of the second information handling system may include generating a first graphical representation of a physical configuration of hardware components located at a front of the second information handling system, generating a second graphical representation of a physical configuration of hardware components located at a back of the second information handling system, or generating other graphical representations of physical configurations of hardware components located on other faces of the second information handling system. In some embodiments, the first information handling system may reference known physical hardware, such as determined component characteristics of hardware components of the information handling system, against a pre-drawn database of information handling system hardware components to determine one or more graphical representations of hardware components. The first information handling system may then assemble a graphical representation of an information handling system including the multiple hardware components using pre-drawn graphical representations, such as scalable vector graphics representations, of hardware components that correspond to the hardware components determined to be present in the second information handling system. For example, the first information handling system may draw the hardware components based on a list of components determined to be present in the second information handling system, a physical configuration of the components, and one or more pre-drawn representations of individual hardware components. In some embodiments, the first information handling system may determine that a hardware change has occurred, such as removal or addition of a hardware component. When such a change is detected, the first information handling system may generate a graphical overlay reflecting the hardware change. For example, when such a change is detected the information handling system may repeat the operations described with respect to blocks 1202 and 1204.

At block 1206, the first information handling system may determine one or more component characteristics of the one or more hardware components shown in the first graphical representation. Such component characteristics may include a form factor of a hardware component, a function of a hardware component, a slot of the second information handling system in which a hardware component is located, a RAID group to which a hardware component belongs, a hot spare status of a hardware component, a bay of the second information handling system in which a hardware component is located, a CXL capability of the hardware component, or other hardware component characteristics. Determination of such characteristics may be performed by querying one or more hardware components for component characteristics or by accessing such characteristics from memory of the information handling system. As one example, the first information handling system may perform back-end discovery of hardware components and configuration of the hardware components to determine component characteristics of the hardware components. In some embodiments, the first information handling system may determine whether hardware components shown in the graphical representation belong to a RAID group, such as a RAID group to which one or more slots are assigned, and specific RAID groups to which hardware components that do belong to RAID groups belong. Likewise, the first information handling system may determine which hardware components are not assigned to a RAID group and which, if any, hardware components are assigned as global or RAID group-specific hot spares. As another example, the first information handling system may determine which bays one or more hardware components are located in, such as which bays one or more slots and one or more hardware components housed in the one or more slots are located in. In some embodiments, an information handling system may perform the operation of block 1206, and any of blocks 1208, 1210, and 1212, before or without performing the operations of blocks 1202 and 1204. In some embodiments, the information handling system may detect changes in hardware component characteristics, such as addition of new hardware components, removal of hardware components, adjustments to configurations of hardware components, such as adjustments to RAID groups or hot spare statuses of hardware components, and the information handling system may adjust the graphical representation of the physical layout of hardware components of the first information handling system or one or more graphical overlays based on the detected changes.

At block 1208, the first information handling system may generate a first graphical overlay for a graphical representation of the physical configuration of the second information handling system based on one or more component characteristics. For example, a first information handling system may generate graphical overlays, as discussed with respect to FIGS. 4-10, based on the determined component characteristics. In some embodiments, one information handling system may generate the first graphical representation of the physical configuration of one or more hardware components of an information handling system, while another information handling system may generate one or more graphical overlays for the graphical representation. In some embodiments, the first graphical overlay may include a first indication of a slot number of each of multiple slots of the second information handling system, such as when an option to show an enumeration of slots of the information handling system is selected.

At block 1210, the first information handling system may determine a selected view. For example, the first information handling system may receive an input from a user indicating a selected view associated with one or more graphical overlays. Such views may include a RAID group view, a bay view, or other views. In some embodiments, display of the first graphical overlay and the first graphical representation may be performed based on determination of the selected view 1212. In some embodiments, determination of the selected view at block 1210 may be performed prior to generation of the first graphical overlay for the graphical representation of the physical configuration of the hardware components at block 1208, and the generation of the first graphical overlay may be performed based on the selected view.

As one example, the first graphical overlay generated at block 1208 may be a graphical overlay indicating RAID group membership of one or more hardware components as discussed with respect to FIGS. 4-5. For example, determining the selected view may include determining, by the first information handling system, that a RAID group view is selected by a user. Generating the first graphical overlay may include determining, by the first information handling system, one or more RAID groups to which one or more of the hardware components belong based on the one or more component characteristics. For example, the first information handling system may determine that a first group of hardware components shown in the graphical representation belong to a first RAID group and that a second group of hardware components shown in the graphical representation belong to a second RAID group. The first information handling system may generate a first graphical indication of the one or more RAID groups to which one or more of the one or more hardware components belong. The first graphical overlay may include the first graphical indication. For example, the information handling system may generate graphical overlay components, as discussed with respect to FIGS. 4-5. As one example, the first information handling system may determine that multiple hardware components are assigned to multiple respective RAID groups and may assign a different color to each RAID group. The first information handling system may then generate indications of the RAID groups for the first graphical overlay, indicating graphical representations of hardware components of each RAID group with the respective color of each RAID group. Displaying the first graphical representation and the first graphical overlay, as discussed with respect to block 1212, may include overlaying the graphical representation with the first graphical overlay. Thus the first graphical overlay may indicate RAID group membership of multiple hardware components to a user. In some embodiments, the first graphical overlay may also include one or more indications of a hot spare status of one or more hardware components. For example, the first graphical overlay may indicate one or more information handling system hardware components that are assigned as global hot spares or RAID group-specific hot spares, as described with respect to FIG. 4.

As another example, the first graphical overlay generated at block 1208 may be a graphical overlay indicating bay location of one or more hardware components as discussed with respect to FIGS. 7-10. For example, determining the selected view may include determining that a bay view is selected by a user. Generating the first graphical overlay may include determining one or more bays in which one or more of the one or more hardware components are located based on the one or more component characteristics. For example, the first information handling system may determine that a first group of hardware components shown in the graphical representation are located in a first bay and that a second group of hardware components shown in the graphical representation are located in a second bay. The first information handling system may generate a first graphical indication of the one or more bays in which the one or more hardware components are located. The first graphical overlay may include the first graphical indication. For example, the information handling system may generate graphical overlay components, as discussed with respect to FIGS. 7-8. Displaying the first graphical representation and the first graphical overlay, as discussed with respect to block 1212, may include overlaying the graphical representation with the first graphical overlay. Thus, the first graphical overlay may indicate bay location of multiple hardware components to a user.

At block 1212, the first information handling system may display the first overlay and the first graphical representation based on the selected view. For example, if the generated first graphical overlay is an overlay associated with a RAID group view and a RAID group view is selected, the first information handling system may display the first graphical overlay associated with the RAID group view. If the generated first graphical overlay is an overlay associated with a bay view and a bay view is selected, the first information handling system may display the first graphical overlay associated with the bay view. The first information handling system may overlay the first graphical representation with the first overlay. Displaying the first overlay and the first graphical representation may include transmitting, by the first information handling system, the first overlay and the first graphical representation to a different information handling system for display on a display of the different information handling system. For example, the first information handling system may transmit display data for displaying the first graphical overlay and the first graphical representation to a third information handling system. As one example, the first information handling system may be a cloud-based server and the third information handling system may be a tablet, smart phone, or laptop. Displaying the first overlay and the first graphical representation may include displaying the first overlay and the first graphical representation on a display of the first information handling system. Thus, a first information handling system may generate graphical representations of physical configurations of hardware components of a second information handling system and graphical overlays for the graphical representations based on component characteristics of the hardware components and may display the graphical representations and graphical overlays for a user.

Figure 13:
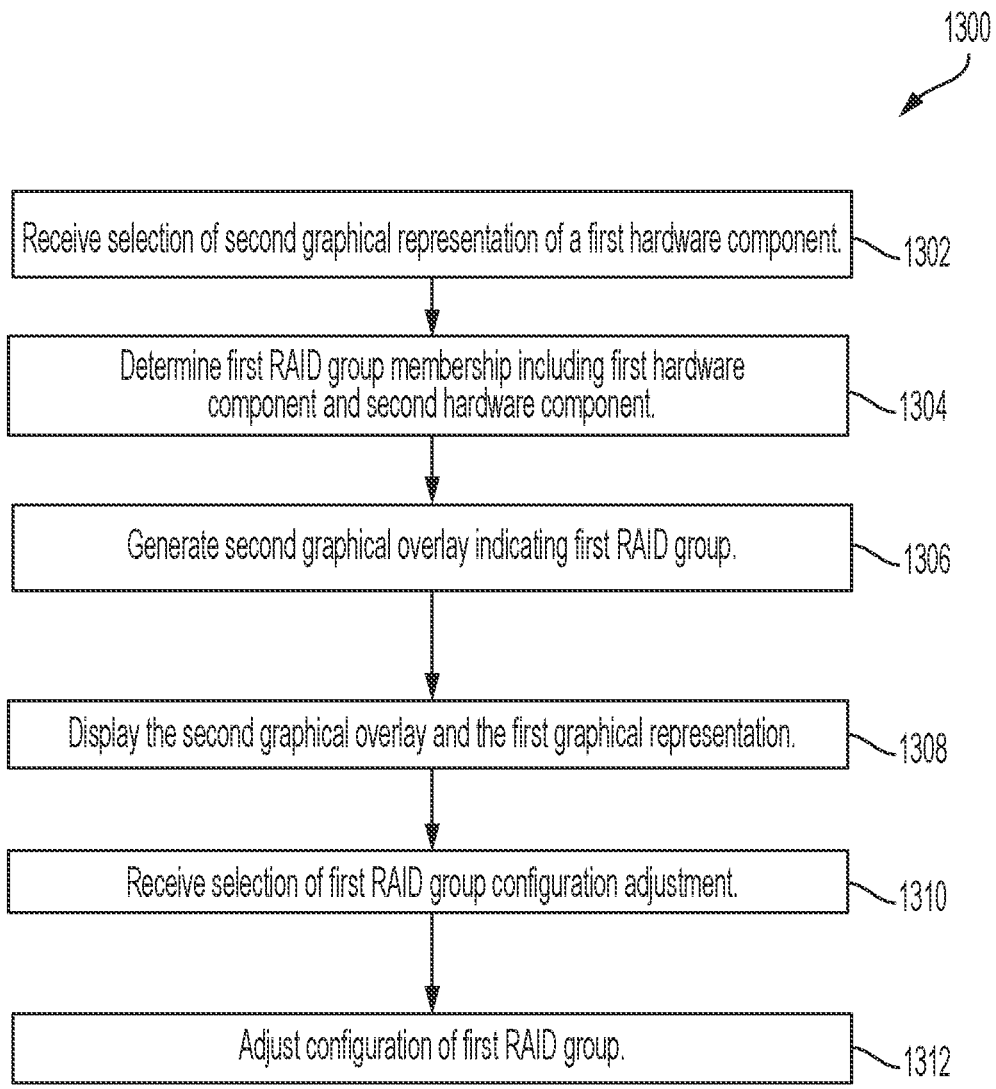
FIG. 13 is a flow chart of an example method for generation of graphical representations of information handling system components and RAID group overlays according to some embodiments of the disclosure.

When the first graphical overlay includes graphical indications of RAID group membership of hardware components, a user may interact with the graphical overlay or the graphical representation of the physical layout of the hardware components to access additional information regarding one or more RAID groups, such as additional graphical overlays, or to configure one or more RAID groups. An example method 1300 for generating additional graphical overlays indicating RAID group information is shown in FIG. 13. The method 1300 may, in some embodiments, be performed following the operations described at block 1210 of FIG. 12. The method 1300 may begin, at block 1302, with receipt, by the first information handling system of a selection of a second graphical representation of a first hardware component. For example, the first graphical representation of the physical configuration of one or more hardware components of a second information handling system, discussed with respect to block 1204 of FIG. 12, may include multiple graphical representations of multiple hardware components. A user may select a graphical representation of a hardware component, such as a graphical representation of a hardware component indicated to be a member of a first RAID group by the first graphical overlay. For example, a user may hover a mouse cursor over the graphical representation of the hardware component or may click on the graphical representation of the hardware component.

At block 1304, the first information handling system may determine a RAID group that includes the first hardware component and a second hardware component. For example, the first graphical overlay may indicate multiple RAID groups, each RAID group including multiple hardware components. When a graphical representation of a hardware component is selected, the first information handling system may determine a first RAID group of which the first hardware component is a member and may determine membership of other hardware components in the first RAID group.

At block 1306, the first information handling system may generate a second graphical overlay indicating the first RAID group. The second graphical overlay may, for example, include a graphical overlay component of the first graphical overlay indicating the first RAID group, such as described with respect to FIG. 5. The second graphical overlay may include a second graphical indication of the first RAID group including the first hardware component and the second hardware component. For example, the second graphical overlay may highlight, outline, or otherwise indicate the graphical representations of hardware components that are members of the first RAID group. At block 1308, the first information handling system may display the second graphical overlay and the first graphical representation. For example, based on the received selection the first information handling system may cease to display the first overlay described with respect to block 1210 of FIG. 12 and may display the second graphical overlay. Display of the second graphical overlay and the first graphical representation may be performed similarly to the display of the first graphical overlay and the first graphical representation described with respect to block 1210 of FIG. 12.

In some embodiments, a graphical user interface including the first graphical representation and the second graphical overlay may enable a user to interact with the first graphical representation or the second graphical overlay to adjust RAID group configurations. At block 1310, the first information handling system may receive a selection of a first RAID group configuration adjustment, such as while the second graphical overlay and the first graphical representation are displayed. For example, as discussed with respect to FIG. 5, a user may select an actions option and may select an option to encrypt a RAID group. Adjustments to a configuration of a RAID group may include renaming a RAID group, deleting a RAID group, editing a cache policy of a RAID group, editing a disk capacity of a RAID group, performing a RAID level migration, initializing a fast mode for the RAID group, initializing a full mode for the RAID group, encrypting a RAID group, and performing other operations on the RAID group. At block 1312, the first information handling system may adjust a configuration of the first RAID group based on the received selection. In some embodiments, before adjusting the configuration of the first RAID group, the first information handling system may request confirmation from a user of the selection of the first adjustment to the configuration of the RAID group. Thus, the graphical user interface including the graphical representation of the physical configuration of hardware components of the information handling system and the graphical overlays may enable a user to adjust a configuration of a RAID group based on four inputs, selecting a graphical representation of a hardware component that is a member of a RAID group, selecting an option to perform one or more actions on the RAID group, selecting a specific configuration adjustment to perform on the RAID group, and confirming the selection of the specific configuration adjustment. When the first information handling system is a different information handling system from the second information handling system, adjusting the configuration of the first RAID group may include transmitting an instruction to adjust the configuration of the first RAID group to the second information handling system that includes the hardware components of the first RAID group.

Figure 14:
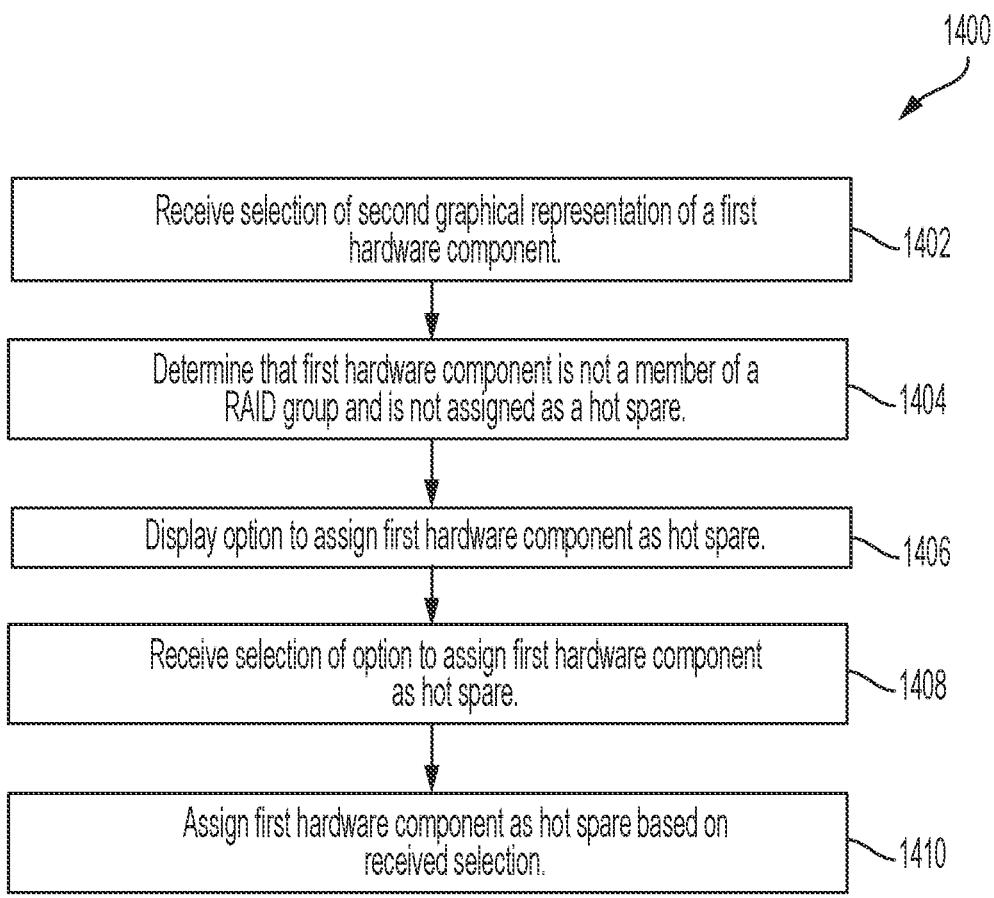
FIG. 14 is a flow chart of an example method for generation of graphical representations of information handling system components and hot spare overlays according to some embodiments of the disclosure.

When a RAID group view is selected, one or more hardware components shown in the graphical representation of the physical configuration of the one or more hardware components may not be members of a RAID group and may not be assigned as RAID group-specific or global hot spares. The first graphical overlay may indicate the one or more hardware components that are not members of RAID groups and are not assigned as hot spares, as discussed with respect to FIGS. 4 and 6. An example method 1400 for configuring hot spare status of unassigned hardware components using the graphical representation and graphical overlays described herein is shown in FIG. 14. The method 1400 may begin at 1402 with receipt of a selection of a second graphical representation of a first hardware component. The second graphical representation of the first hardware component may be included in the first graphical representation. As discussed herein a graphical representation of a hardware component may be received by receiving input of a cursor hovering over the second graphical representation of the hardware component or by receiving input of a user clicking on the second graphical representation of the hardware component.

At block 1404, the first information handling system may determine that the first hardware component is not a member of a RAID group and is not currently assigned as a hot spare. Such a determination may, for example, be made based on component characteristics of the first hardware component. For example, the determination that the first hardware component is not a member of a RAID group may be a determination that the first hardware component is not a member of any of the one or more RAID groups referenced with respect to blocks 1206 and 1208 of FIG. 12.

At block 1406, the first information handling system may display an option to assign the first hardware component as a hot spare. In some embodiments, the first information handling system may generate a second graphical overlay including the option to assign the first hardware component as a hot spare. In some embodiments the second graphical overlay may be overlaid on the first graphical overlay and the first graphical representation. For example, the second graphical overlay may include one or more windows, such as windows 610 and 614 of FIG. 6. The option may, for example, be an option to assign the first hardware component as a global hot spare or as a RAID group-specific hot spare. In some embodiments, the first information handling system may display an option to perform one or more actions on the hardware component. When the option to perform one or more actions on the hardware component is selected, the first information handling system may display options for one or more actions that may be performed, such as assigning the first hardware component as a hot spare. In some embodiments, other options may be displayed, as described with respect to FIG. 6.

At block 1408, the first information handling system may receive a selection of the option to assign the first hardware component as a hot spare. For example, a user may select the option using a mouse or other input device. At block 1410, the first information handling system may assign the first hardware component as a hot spare based on the received selection. In some embodiments, before assigning the first hardware component as a hot spare, the first information handling system may request configuration from a user of the selection of the option to assign the first hardware component as a hot spare. Thus, the graphical user interface including the graphical representation of the physical configuration of hardware components of the information handling system and the graphical overlays may enable a user to assign a first hardware component as a hot spare based on four inputs, selecting a graphical representation of a hardware component that is not a member of a RAID group and is not assigned as a hot spare, selecting an option to perform one or more actions on the hardware component, selecting an option to assign the hardware component as a hot spare, and confirming the selection of the option to assign the hardware component as a hot spare. When the first information handling system is a different information handling system from the second information handling system, assigning the first hardware component as a hot spare may include transmitting an instruction to assign the first hardware component as a hot spare to the second information handling system that includes the hardware components of the first RAID group.

Figure 15:
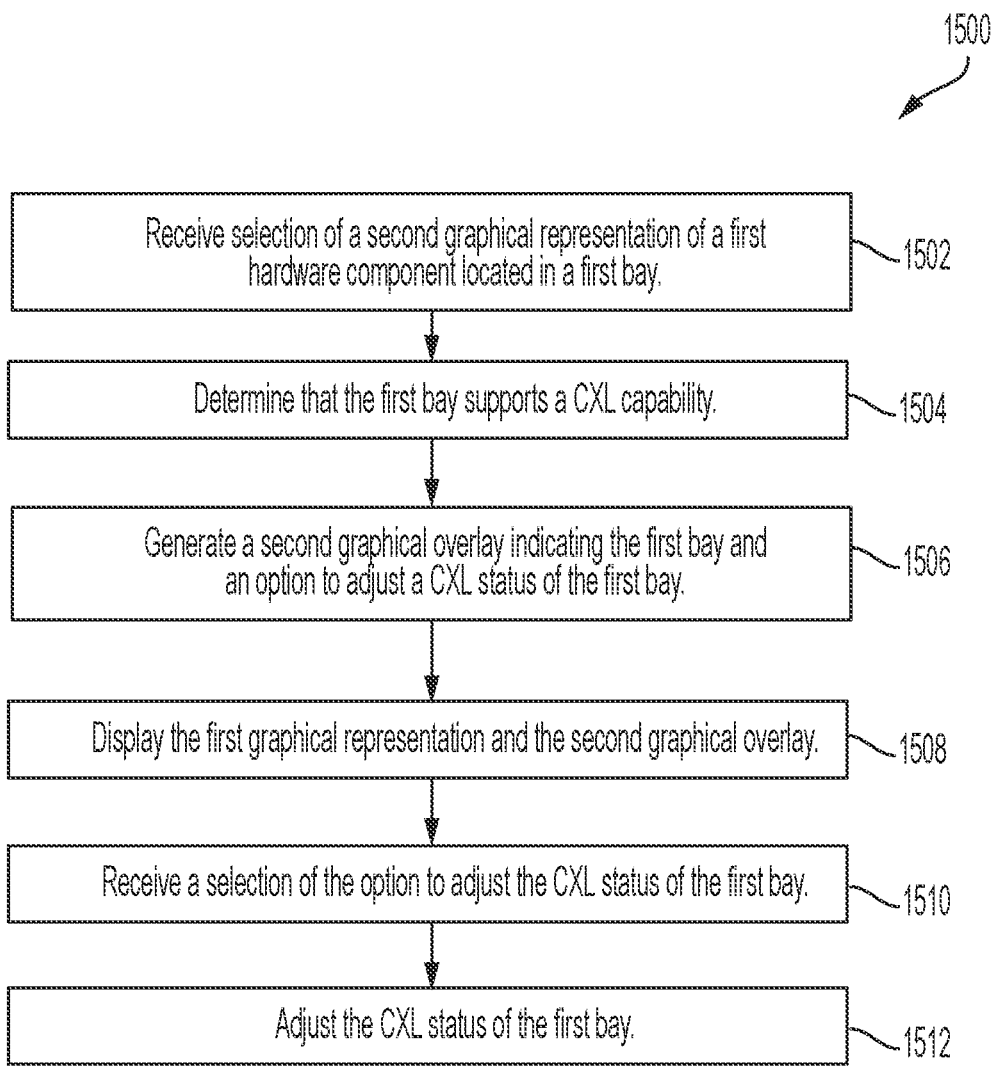
FIG. 15 is a flow chart of an example method for generation of graphical representations of information handling system components and bay location overlays according to some embodiments of the disclosure.

When a bay view is selected, a user may interact with the graphical representation of the physical configuration of the one or more hardware components and the overlays to configure one or more bays of an information handling system. An example method 1500 for generating graphical overlays indicating bay information and receiving user input for configuring one or more bays is shown in FIG. 15. In some embodiments, the method 1500 may, for example, be performed following the method 1200 of FIG. 12. The method 1500 may begin, at block 1502, with receiving a selection of a second graphical representation of a first hardware component of the one or more hardware components. The first graphical representation discussed with respect to the method 1200 may include the second graphical representation, and the first hardware component may be located in a first bay of one or more bays of the second information handling system. For example, the first graphical representation of the physical configuration of one or more hardware components of a second information handling system, discussed with respect to block 1204 of FIG. 12, may include multiple graphical representations of multiple hardware components. A user may select a graphical representation of a hardware component, such as a graphical representation of a hardware component indicated to be located in a first bay by the first graphical overlay. For example, a user may hover a mouse cursor over the graphical representation of the hardware component or may click on the graphical representation of the hardware component.

At block 1504, the first information handling system may determine that the first bay, in which the selected first hardware component is located supports a CXL capability. Such a determination may, for example, be made based on one or more component characteristics of the first bay.

At block 1506, the first information handling system may generate a second graphical overlay for the first graphical representation. The second graphical overlay may include a second graphical indication of the first bay and may further include a third graphical indication of an option to adjust a CXL status of the first bay. For example, the second graphical overlay may highlight, outline, or otherwise indicate the graphical representations of hardware components that are located in the first bay. In some embodiments, the second graphical overlay may not include a CXL status of a first bay, and in some embodiments, the first information handling system may not determine that the first bay supports a CXL capability, such as when the first bay does not support a CXL capability. In some embodiments, the second graphical overlay may include a window displaying information about the first bay, such as capabilities of the first bay. Such information may include the information discussed with respect to window 902 of FIG. 9. For example, such information may include capabilities of the first bay, such as technology types supported by the first bay, a physical location of the first bay, a bus type of the first bay, a hot serviceable status of the first bay, media types supported by the first bay, a CPU affinity status of the first bay, and other information about the first bay.

At block 1508, the first information handling system may display the first graphical representation and the second graphical overlay. For example, based on the received selection the first information handling system may cease to display the first overlay described with respect to block 1210 of FIG. 12 and may display the second graphical overlay. Display of the second graphical overlay and the first graphical representation may be performed similarly to the display of the first graphical overlay and the first graphical representation described with respect to block 1210 of FIG. 12.

In some embodiments, a graphical user interface including the first graphical representation and the second graphical overlay may enable a user to interact with the first graphical representation or the second graphical overlay to adjust a configuration of a bay, such as a CXL status of a bay. At block 1510 the first information handling system may receive a selection of a the option to adjust the CXL status of the first bay, such as while the second graphical overlay and the first graphical representation are displayed. For example, as discussed with respect to FIG. 10, a user may select an option to upgrade the bay to CXL if the bay is not upgraded to CXL or to downgrade the bay to non-CXL if the bay is upgraded to CXL. In some embodiments, as discussed with respect to FIG. 10, a user may select an actions option and may select an option to adjust a configuration of the bay. At block 1512, the first information handling system may adjust the CXL status of the first bay based on the received selection. In some embodiments, before adjusting the CXL status of the first bay, the first information handling system may request confirmation from a user of the selection of the adjustment to the CXL status of the first bay. Thus, the graphical user interface including the graphical representation of the physical configuration of hardware components of the information handling system and the graphical overlays may enable a user to adjust a CXL status of a first bay based on three inputs, selecting a graphical representation of a hardware component that is located in a first bay, selecting an option to adjust a CXL status of the first bay, and confirming the selection of the option to adjust the CXL status of the first bay. When the first information handling system is a different information handling system from the second information handling system, adjusting the CXL status of the first bay may include transmitting an instruction to adjust the CXL status of the first bay to the second information handling system that includes the first bay. Thus, an interactive graphical representation of a physical configuration of hardware components of an information handling system may allow a user to easily determine details regarding hardware components of an information handling system and to accurately adjust a configuration of components of an information handling system.

The flow chart diagrams of FIGS. 12-15 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   determining one or more component characteristics of one or more hardware components of an information handling system;
   generating a first graphical overlay for a first graphical representation of a physical configuration of the one or more hardware components based on the one or more component characteristics;
   determining a selected view; and
   displaying the first graphical overlay and the first graphical representation based on the determination of the selected view.

2. The method of claim 1, wherein the one or more component characteristics comprise at least one of:
   a slot of the information handling system in which a first hardware component of the one or more hardware components is located;
   a redundant array of independent disks (RAID) group to which the first hardware component belongs;
   a hot spare status of the first hardware component;
   a bay of the information handling system in which the first hardware component is located; or
   a compute express link (CXL) capability of the first hardware component.

3. The method of claim 1, further comprising:
   determining the physical configuration of the one or more hardware components; and
   generating the first graphical representation of the physical configuration of the one or more hardware components based on the determined physical configuration of the one or more hardware components.

4. The method of claim 1, wherein determining a selected view comprises determining that a redundant array of independent disks (RAID) group view is selected, and wherein generating the first graphical overlay comprises:
   determining one or more RAID groups to which one or more of the one or more hardware components belong based on the one or more component characteristics; and
   generating a first graphical indication of the one or more RAID groups to which one or more of the one or more hardware components belong, wherein the first graphical overlay comprises the first graphical indication, and wherein displaying the first graphical representation and the first graphical overlay comprises overlaying the first graphical overlay on the first graphical representation.

5. The method of claim 4, further comprising:
   receiving a selection of a second graphical representation of a first hardware component of the one or more hardware components, wherein the first graphical representation includes the second graphical representation;
   determining that the first hardware component and a second hardware component belong to a first RAID group;
   generating a second graphical overlay for the first graphical representation of the physical configuration of the one or more hardware components, wherein the second graphical overlay comprises a second graphical indication of the first RAID group including the first hardware component and the second hardware component; and
   displaying the second graphical overlay and the first graphical representation based on the selection of the second graphical representation of the first hardware component.

6. The method of claim 5, further comprising:
   receiving a selection of a first adjustment to a configuration of the first RAID group while the second graphical overlay and the first graphical representation are displayed; and
   adjusting the configuration of the first RAID group based on the received selection.

7. The method of claim 4, further comprising:
   receiving a selection of a second graphical representation of a first hardware component of the one or more hardware components, wherein the first graphical representation includes the second graphical representation;
   determining that the first hardware component is not a member of any of the one or more RAID groups and is not assigned as a hot spare;
   displaying an option to assign the first hardware component as a hot spare;
   receiving a selection of the option to assign the first hardware component as a hot spare; and
   assigning the first hardware component as a hot spare based on the received selection.

8. The method of claim 1, wherein determining a selected view comprises determining that a bay view is selected, and wherein generating the first graphical overlay comprises:
   determining one or more bays in which one or more of the one or more hardware components are located based on the one or more component characteristics; and
   generating a first graphical indication of the one or more bays in which one or more of the one or more hardware components are located, wherein the first graphical overlay comprises the first graphical indication, and wherein displaying the first graphical representation and the first graphical overlay comprises overlaying the first graphical overlay on the first graphical representation.

9. The method of claim 8, further comprising:
   receiving a selection of a second graphical representation of a first hardware component of the one or more hardware components, wherein the first graphical representation includes the second graphical representation, and wherein the first hardware component is located in a first bay of the one or more bays;
   determining that the first bay supports a compute express link (CXL) capability;
   generating a second graphical overlay for the first graphical representation of the physical configuration of the one or more hardware components, wherein the second graphical overlay comprises a second graphical indication of the first bay, and wherein the second graphical overlay further comprises a third graphical indication of an option to adjust a CXL status of the first bay;
   displaying the first graphical representation and the second graphical overlay;
   receiving a selection of the third graphical indication of the option to adjust the CXL status of the first bay; and adjusting the CXL status of the first bay based on the received selection.

10. A first information handling system, comprising:
a memory; and
at least one processor coupled to the memory, wherein the at least one processor is configured to:
   determine one or more component characteristics of one or more hardware components of a second information handling system;
   generate a first graphical overlay for a first graphical representation of a physical configuration of the one or more hardware components based on the one or more component characteristics;
   determine a selected view; and
   display the first graphical overlay and the first graphical representation based on the determination of the selected view.

11. The first information handling system of claim 10, wherein the at least one processor is further configured to:
   determine the physical configuration of the one or more hardware components; and
   generate the first graphical representation of the physical configuration of the one or more hardware components based on the determined physical configuration of the one or more hardware components.

12. The first information handling system of claim 10, wherein to determine the selected view the at least one processor is further configured to determine that a redundant array of independent disks (RAID) group view is selected; and wherein to generate the first graphical overlay the at least one processor is further configured to:
   determine one or more RAID groups to which one or more of the one or more hardware components belong based on the one or more component characteristics; and
   generate a first graphical indication of the one or more RAID groups to which one or more of the one or more hardware components belong, wherein the first graphical overlay comprises the first graphical indication, and wherein displaying the first graphical representation and the first graphical overlay comprises overlaying the first graphical overlay on the first graphical representation.

13. The first information handling system of claim 12, wherein the at least one processor is further configured to:
   receive a selection of a second graphical representation of a first hardware component of the one or more hardware components, wherein the first graphical representation includes the second graphical representation;
   determine that the first hardware component and a second hardware component belong to a first RAID group;
   generate a second graphical overlay for the first graphical representation of the physical configuration of the one or more hardware components, wherein the second graphical overlay comprises a second graphical indication of the first RAID group including the first hardware component and the second hardware component; and
   display the second graphical overlay and the first graphical representation based on the selection of the second graphical representation of the first hardware component.

14. The first information handling system of claim 13, wherein the at least one processor is further configured to:
   receive a selection of a first adjustment to a configuration of the first RAID group while the second graphical overlay and the first graphical representation are displayed; and
   adjust the configuration of the first RAID group based on the received selection.

15. The first information handling system of claim 12, wherein the at least one processor is further configured to:
   receive a selection of a second graphical representation of a first hardware component of the one or more hardware components, wherein the first graphical representation includes the second graphical representation;
   determine that the first hardware component is not a member of any of the one or more RAID groups and is not assigned as a hot spare;
   display an option to assign the first hardware component as a hot spare;
   receive a selection of the option to assign the first hardware component as a hot spare; and
   assign the first hardware component as a hot spare based on the received selection.

16. The first information handling system of claim 10, wherein to determine the selected view the at least one processor is further configured to determine that a bay view is selected, and wherein to generate the first graphical overlay the at least one processor is further configured to:
   determine one or more bays in which one or more of the one or more hardware components are located based on the one or more component characteristics; and
   generate a first graphical indication of the one or more bays in which one or more of the one or more hardware components are located, wherein the first graphical overlay comprises the first graphical indication, and wherein displaying the first graphical representation and the first graphical overlay comprises overlaying the first graphical overlay on the first graphical representation.

17. The first information handling system of claim 16, wherein the at least one processor is further configured to:
   receiving a selection of a second graphical representation of a first hardware component of the one or more hardware components, wherein the first graphical representation includes the second graphical representation, and wherein the first hardware component is located in a first bay of the one or more bays;
   determine that the first bay supports a compute express link (CXL) capability;
   generate a second graphical overlay for the first graphical representation of the physical configuration of the one or more hardware components, wherein the second graphical overlay comprises a second graphical indication of the first bay, and wherein the second graphical overlay further comprises a third graphical indication of an option to adjust a CXL status of the first bay;
   display the first graphical representation and the second graphical overlay;
   receive a selection of the third graphical indication of the option to adjust the CXL status of the first bay; and
   adjust the CXL status of the first bay based on the received selection.

18. A computer program product, comprising:
a non-transitory computer readable medium comprising instructions for causing a first information handling system to perform steps comprising:
   determining one or more component characteristics of one or more hardware components of a second information handling system;

generating a first graphical overlay for a first graphical representation of a physical configuration of the one or more hardware components based on the one or more component characteristics;

determining a selected view; and displaying the first graphical overlay and the first graphical representation based on the determination of the selected view.

19. The computer program product of claim 18, wherein determining the selected view comprises determining that a redundant array of independent disks (RAID) group view is selected, and wherein generating the first graphical overlay comprises:

determining one or more RAID groups to which one or more of the one or more hardware components belong based on the one or more component characteristics; and generating a first graphical indication of the one or more RAID groups to which one or more of the one or more hardware components, wherein the first graphical overlay comprises the first graphical indication, and wherein displaying the first graphical representation and the first graphical overlay comprises overlaying the first graphical overlay on the first graphical representation.

20. The computer program product of claim 18, wherein determining the selected view comprises determining that a bay view is selected, and wherein generating the first graphical overlay comprises:

determining one or more bays in which one or more of the one or more hardware components are located based on the one or more component characteristics; and generating a first graphical indication of the one or more bays in which one or more of the one or more hardware components are located, wherein the first graphical overlay comprises the first graphical indication, and wherein displaying the first graphical representation and the first graphical overlay comprises overlaying the first graphical overlay on the first graphical representation.

* * * * *